US008227547B2

(12) United States Patent
Jiang et al.

(10) Patent No.: US 8,227,547 B2
(45) Date of Patent: *Jul. 24, 2012

(54) FOAMABLE THERMOPLASTIC REACTOR BLENDS AND FOAM ARTICLE THEREFROM

(75) Inventors: Peijun Jiang, League City, TX (US); Abdelhadi Sahnoune, Houston, TX (US); Armenag Dekmezian, Austin, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/986,645

(22) Filed: Jan. 7, 2011

(65) Prior Publication Data

US 2011/0118370 A1 May 19, 2011

Related U.S. Application Data

(63) Continuation-in-part of application No. 12/335,252, filed on Dec. 15, 2008, and a continuation-in-part of application No. 12/638,843, filed on Dec. 15, 2009, and a continuation-in-part of application No. 12/638,861, filed on Dec. 15, 2009.

(51) Int. Cl.
*C08F 8/00* (2006.01)
*C08L 23/10* (2006.01)
*C08J 9/00* (2006.01)
*C08J 9/12* (2006.01)
*C08J 9/30* (2006.01)

(52) U.S. Cl. ............ 525/191; 525/240; 521/75; 521/82; 521/94; 521/95

(58) Field of Classification Search .................. 525/191, 525/240; 521/75, 82, 94, 95
See application file for complete search history.

(56) References Cited

U.S. PATENT DOCUMENTS

| 4,824,912 | A | 4/1989 | Su |
| 4,832,770 | A | 5/1989 | Nojiri et al. |
| 5,166,268 | A | 11/1992 | Ficker |
| 5,180,751 | A | 1/1993 | Park et al. |
| 6,287,705 | B1 | 9/2001 | Seta et al. |
| 6,583,193 | B2 | 6/2003 | Park et al. |
| 6,583,227 | B2 | 6/2003 | Mehta et al. |
| 6,590,006 | B2 | 7/2003 | Park et al. |
| 6,635,715 | B1 | 10/2003 | Datta et al. |
| 6,642,316 | B1 | 11/2003 | Datta et al. |
| 6,660,809 | B1 | 12/2003 | Weng et al. |
| 6,713,520 | B2 | 3/2004 | Sahnoune et al. |
| 6,815,508 | B1 | 11/2004 | Terano et al. |
| 6,939,919 | B2 | 9/2005 | Tau et al. |
| 7,101,936 | B2 | 9/2006 | Weng et al. |
| 8,022,142 | B2 | 9/2011 | Jiang et al. |
| 8,093,335 | B2 * | 1/2012 | Jiang et al. ............... 525/191 |
| 8,101,685 | B2 | 1/2012 | Jiang et al. |
| 2004/0249084 | A1 | 12/2004 | Stevens et al. |
| 2004/0260025 | A1 | 12/2004 | Ravishanker et al. |
| 2006/0173132 | A1 | 8/2006 | Mehta et al. |
| 2006/0199873 | A1 | 9/2006 | Mehta et al. |
| 2006/0211819 | A1 | 9/2006 | Hoenig et al. |
| 2008/0027173 | A1 | 1/2008 | Ravishankar |
| 2008/0033124 | A1 | 2/2008 | Jiang et al. |
| 2010/0152360 | A1 | 6/2010 | Jiang et al. |
| 2010/0152382 | A1 | 6/2010 | Jiang et al. |
| 2010/0152388 | A1 | 6/2010 | Jiang et al. |
| 2010/0152390 | A1 | 6/2010 | De Gracia et al. |

FOREIGN PATENT DOCUMENTS

| EP | 0 206 515 | 12/1986 |
| EP | 0 129 368 | 7/1989 |
| EP | 0 366 411 | 5/1990 |
| JP | 08-041253 | 2/1996 |
| JP | 10-110068 | 4/1998 |
| JP | 2004-231844 | 8/2004 |
| JP | 2004-359911 | 12/2004 |
| WO | WO 98/26000 | 6/1998 |
| WO | WO 98/27154 | 6/1998 |
| WO | WO 03/040201 | 5/2003 |
| WO | WO 2004/016679 | 2/2004 |
| WO | WO 2004/060994 | 7/2004 |

(Continued)

OTHER PUBLICATIONS

Arriola et al., *Catalytic Production of Olefin Block Copolymers via Chain Shuttling Polymerization*, Science, 2006, vol. 312, pp. 714-719.
Dankova et al., *Models for Conformationally Dynamic Metallocenes. Copolymerization Behavior of the Unbridged Metallocene (1-Methyl-2-phenylindenyl)(2-phenylindenyl)zirconium Dichloride*, Macromolecules, 2002, vol. 35, No. 8, pp. 2882-2891.
Lohse et al., *Graft Copolymer Compatibilizers for Blends of Polypropylene and Ethylene-Propylene Copolymers*, Macromolecules, 1991, vol. 24, No. 2, pp. 561-566.
Paavola et al., *Propylene Copolymerization With Non-conjugated Dienes and α-olefins Using Supported Metallocene Catalyst*, Polymer, 2004, vol. 45, No. 7, pp. 2099-2110.

(Continued)

Primary Examiner — Nathan M Nutter
(74) Attorney, Agent, or Firm — Catherine L. Bell

(57) ABSTRACT

This invention relates to a foamable blend comprising an in-reactor polymer blend comprising: (a) a first propylene polymer component comprising 90 to 100 wt % propylene and from 0 to less than 10 wt % comonomer, said first propylene component having a Tm of 120° C. or more; and (b) a second propylene polymer component comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer, wherein the polymer blend, prior to combination with a foaming agent, has: (i) a Tm of at least 120° C.; (ii) a MFR of 10 dg/min or more; (iii) a tensile strength of at least 8 MPa; (iv) an elongation at break of at least 200%, and (v) a ratio of elongational viscosity at break to linear viscosity of 5 or more when the elongational viscosity is measured at a strain rate of 1 sec$^{-1}$ and temperature of 180° C.; and where when the blend is foamed with a foaming agent, the foamed article has a density of 800 kg/m$^3$ or less.

28 Claims, 2 Drawing Sheets

FOREIGN PATENT DOCUMENTS

WO    WO 2007/001644    1/2007

OTHER PUBLICATIONS

Tynys et al., *Copolymerisation of 1,9-decadiene and Propylene With Binary and Isolated Metallocene Systems,* Polymer, 2007, vol. 48, No. 10, pp. 2793-2805.

Ye et al., *Synthesis and Rheological Properties of Long-Chain-Branched Isotactic Polypropylenes Prepared by Copolymerization of Propylene and Nonconjugated Dienes,* Ind. Eng. Chem. Res., 2004, vol. 43, No. 11, pp. 2860-2870.

* cited by examiner (a) Example 1 - 35 mm (b) Example 2 - 35 mm (c) Example 4 - 35 mm (d) Example PP1 - 35 mm (comparative)

(e) Example 1 - 90 mm (f) Example 2 - 90 mm (g) Example 4 - 90 mm (h) Example PP1 - 90 mm (comparative)

FOAMABLE THERMOPLASTIC REACTOR BLENDS AND FOAM ARTICLE THEREFROM

PRIORITY CLAIM

This application is a continuation-in-part of U.S. Ser. No. 12/335,252, filed Dec. 15, 2008.

This application is also a continuation-in-part of U.S. Ser. No. 12/638,843, filed Dec. 15, 2009, which is a continuation in part of U.S. Ser. No. 12/335,252, filed Dec. 15, 2008.

This application is also a continuation-in-part of U.S. Ser. No. 12/638,861, filed Dec. 15, 2009, which is a continuation in part of U.S. Ser. No. 12/335,252, filed Dec. 15, 2008.

RELATED APPLICATIONS

This application is related to U.S. Ser. No. 12/638,916, filed on Dec. 15, 2009 and U.S. Ser. No. 12/638,895, filed on Dec. 15, 2009.

FIELD OF THE INVENTION

This invention relates to foam articles comprising an in-reactor polymer blend comprising two propylene-containing polymers having different crystallinities.

BACKGROUND OF THE INVENTION

Foamed polymeric materials are well known, and typically are produced by introducing a physical foaming agent into a molten polymeric stream, mixing the foaming agent with the polymer, and extruding the mixture into the atmosphere while shaping the mixture. Exposure to atmospheric conditions typically causes the foaming agent to gasify, thereby forming cells in the polymer. Under some conditions the cells can be made to remain isolated, and a closed-cell foamed material results. Under other, typically more violent foaming conditions, the cells rupture or become interconnected and an open-cell material results. As an alternative to a physical foaming agent, a chemical foaming agent can be used; which undergoes chemical decomposition (typically upon application of heat or pressure) in the polymer material causing formation of a gas.

Polymer melt must sustain high tensile stresses (or melt strength) without cell interface fracture. Cell interface fracture leads to neighboring cell coalescence and repeated fracture leads formation of very large cells and foam collapse. Once foam has formed, its geometry needs to remain stable while the thermoplastic cools and solidifies. Polyolefins such as low density polyethylene (LDPE) and polypropylene (PP) are commonly used in many non-crosslinked foam applications. For example, U.S. Pat. No. 6,583,193 discloses an extruded, coalesced polypropylene foam that is either open-celled which is useful for sound insulation applications or close celled which is useful for thermal insulation applications. Of these, polyethylene is preferred because of ease of foaming control. While foams including polypropylene components are known, in most cases such foams include significant proportion of additives that add controllability to the foaming process.

Polypropylene (PP) is relatively new to foam applications. Traditional PP's are semi-crystalline materials with linear molecular structures. Deficits in melt strength and extensional rheological properties limit its application to foams with a density higher than 500 kg/m$^3$. This type of PP does not allow for controlling cell growth or preventing the cell wall from breaking during the foaming process.

To overcome the low tensile strength without sacrificing processability, blends of polyolefins with a component of high molecular weight (or low melt flow rate) material are commonly used. Polyolefin foams consisting of polyolefins of ultrahigh molecular weight, i.e., weight-average molecular weight from about $4\times10^5$ to $6\times10^6$ g/mol and higher are disclosed in U.S. Pat. No. 5,180,751. US '751 describes polypropylene foam made of polypropylene resins having a z-average molecular weight above $1\times10^6$ and a Mz/Mw ratio above 3.0. US '571 also states that unacceptable foam sheets show a unimodal molecular weight distribution, while resins which yield acceptable foam sheets show a bimodal molecular weight distribution.

PP can also be blended with a softer component such as copolymer of ethylene and vinyl acetate (EVA), ethylene-ethyl acrylate copolymer (EEA), ethylene-acrylic acid copolymer (EAA), or other ethylene copolymers having a low melting point to make soft foams for a variety of applications. For example, U.S. Pat. No. 6,590,006 discloses macrocellular foams comprising a blend of a high melt strength polypropylene and an ethylene copolymer such as EVA, EEA, and EAA for use in sound absorption and insulation applications.

U.S. Pat. No. 4,832,770 describes a method of manufacturing a foamed polypropylene resin from a mixture of 80 to 20 wt % of a crystalline polypropylene-ethylene block copolymer containing 20 wt % or less of ethylene and having a melt index of two or less and 20 to 80 wt % of a crystalline polypropylene-ethylene block or random copolymer containing 5 wt % or less of ethylene and having a melt index of 6 to 20 or a polypropylene homopolymer having a melt index of 6 to 20.

In addition to the above, foamed profiles of rubbers such as ethylene-propylene-diene (EPDM) rubber have been used in vulcanized form for high mechanical strength. The elastomeric characteristics of the EPDM rubber foam allow it to conform to the shapes needed and to be effectively compressed into gaps and corners of automotive openings when they are closed such that compressed foam hinders the entry of noise, dust and moisture. However, the construction of the EPDM rubber foam profiles and vulcanization of the EPDM requires careful and difficult handling.

Thermoplastic vulcanizate (TPV) compositions are thermoplastic with a pre-cross-linked rubber phases, e.g., EPDM rubber, and can be much more readily formed into complex shapes as with thermoplastic molding, retain mechanical strength much longer, and still provide resistance to moisture intake, as well as noise, dirt, etc. However, known TPV foam compositions tend not to provide the level of moisture intake prevention that the EPDM rubber foam compound counterparts do.

U.S. Pat. No. 6,713,520 describes thermoplastic vulcanizate foam compositions comprising a mixture that includes from about 15 to about 95 percent by weight of the rubber, and from about 5 to about 85 percent by weight of a thermoplastic component, based upon the total weight of the rubber and thermoplastic component combined, where the thermoplastic component includes from about 65 to about 90 percent by weight of a conventional thermoplastic resin and from about 10 to about 35 percent by weight of a random propylene copolymer based upon the total weight of the thermoplastic component.

WO 2004/016679A2 describes soft thermoplastic vulcanizate foams comprising polyolefin thermoplastic resin, an at least partially crosslinked olefinic elastomer, hydrogenated styrenic block copolymer, and optional additives. The soft foams have smooth surfaces, low water absorption, improved compression set and compression load deflection.

These compositions show better flexibility compared to that of the isotactic polypropylene alone, but are still lacking in other physical attributes. Physical blends also have the problems of inadequate miscibility. Immiscible components can phase separate or allow smaller components to migrate to the surface. Reactor blends, also called intimate blends (a composition comprising two or more polymers made in the same reactor or in a series of reactors), are often used to address these issues, however finding catalyst systems that will operate under the same environments to produce different polymers has been a significant challenge.

There is a strong and growing demand for polypropylene based foams in a market which has been traditionally served by materials such as polyurethane, polystyrene and polyethylene. Polypropylene based foams bring additional benefits to this market area, such as high heat resistance, excellent chemical resistance, and insulation properties. An ongoing need exists for polypropylene with good processability and high extensional rheological properties, which is desirable for foam applications.

Furthermore, a need exists for a relatively straightforward method of preparing polypropylene based material for foam application having desirable properties, particularly a method that does not require the use of a cross-linking agent, e.g., post-polymerization treatments, or the use of comonomers that have been found to result in undesirable gel formation, such as certain types of diene comonomers. According to the present invention there is provided foamed articles comprising a reactor polymer blend exhibiting a unique combination of a high melt flow rate combined with high tensile strength, and elongation at break.

SUMMARY OF THE INVENTION

This invention relates to foamable thermoplastic in-reactor blends comprising:

(a) a first propylene polymer comprising 90 to 100 wt % propylene and from 0 to less than 10 wt % comonomer, said first propylene polymer component having a Tm of 120° C. or more (preferably 135° C. or more);

(b) a second propylene polymer component comprising from 30 to 90 wt % propylene and 70 to 10 wt % comonomer, said second propylene polymer having an Mw of 30,000 g/mol or more, and said second propylene-containing polymer having a different crystallinity (e.g. at least 5% with respect to one another) from the first polymer; and (c) from 0 to 10 wt % of foaming agent based upon the total material in the blend; wherein, prior to combination with foaming agent, the foamable thermoplastic in-reactor blend has:

(a) a Tm of at least 120° C. (preferably at least 135° C.);
(b) a melt flow rate of 10 dg/min or more;
(c) a tensile strength of at least 8 MPa;
(d) an elongation at break of at least 200%;
(e) a ratio of elongational viscosity (measured at 180° C.) at break to linear viscosity at a strain rate of 1 $sec^{-1}$ of 5 or more; and wherein, when foamed using a foaming agent, the foamed article has (f) a density of 800 kg/m³ or less, preferably 400 kg/m³ or less. Foam density is determined according to ASTM D 1622-08.

This invention also relates to foamed articles comprising foamable thermoplastic in-reactor blends comprising:

(a) a first propylene polymer component comprising 90 to 100 wt % propylene and from 0 to less than 10 wt % comonomer, said first propylene component having a Tm of 120° C. or more; and (b) a second propylene polymer component comprising from 30 to 90 wt % propylene and 70 to 10 wt % comonomer, said second propylene polymer having an Mw of 30,000 g/mol or more, and said second propylene polymer having a different crystallinity (e.g., at least 5% relative to each other) from the first propylene polymer;

wherein the in-reactor blend, prior to combination with the foaming agent, has:

(i) a Tm of at least 120° C.;
(ii) a melt flow rate of 10 dg/min or more;
(iii) a tensile strength of at least 8 MPa;
(iv) an elongation at break of at least 200%;
(v) a ratio of elongational viscosity at break (Measured at 180° C.) to linear viscosity at a strain rate of 1 $sec^{-1}$ of 5 or more; and wherein, when foamed using a foaming agent, the foamed article has (vi) a density of 800 kg/m³ or less, preferably 400 kg/m³ or less.

This invention also relates to a process for producing a foamed polyolefin article, comprising:

(a) mixing a foaming agent with a molten polyolefin to form a foamable mixture;

(b) forming (such as extruding or molding) said foamable mixture so that said foaming agent expands within said mixture to produce a foam;

(c) obtaining a foamed article having has a density of 800 kg/m³ or less;

wherein the molten polyolefin is a foamable thermoplastic in-reactor polymer blend comprising:

(a) a first propylene polymer component comprising 90 to 100 wt % propylene and from 0 to less than 10 wt % comonomer, said first propylene component having a Tm of 120° C. or more; and (b) a second propylene polymer component comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer;

wherein the polymer blend has:

(a) a Tm of at least 120° C.;
(b) a melt flow rate of 10 dg/min or more;
(c) a tensile strength of at least 8 MPa;
(d) an elongation at break of at least 200%; and
(e) a ratio of elongational viscosity at break to linear viscosity of 5 or more when the elongational viscosity is measured at a strain rate of 1 $sec^{-1}$ and 180° C.

DETAILED DESCRIPTION OF THE INVENTION

Figure 1:
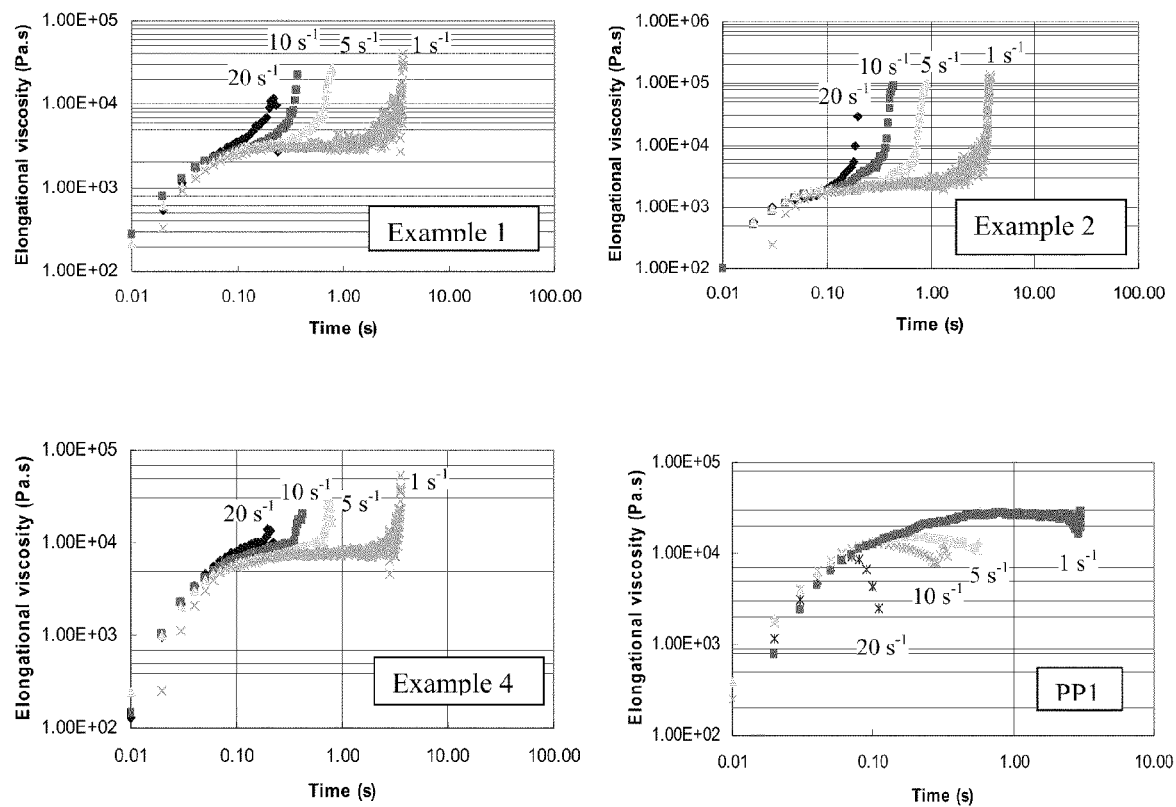
FIG. 1 is the transient elongational viscosity measured at 180° C. for four different Hencky strain rates (1, 5, 10, and 20 $sec^{-1}$) for product produced in Examples 1, 2, and 4 as well as for comparative polymer PP1.

As used herein the term "in-reactor polymer blend" means a mixture of polymers produced in a plurality of polymerization stages without the need for post polymerization blending (although the resultant copolymer can undergo post polymerization blending, for example, to incorporate modifiers, additives, or additional blend components). Each polymer component in the mixture possesses a unique molecular structure such as comonomer content, composition distribution, molecular weight, molecular weight distribution, and/or molecular architecture such as branched block copolymers. Although the various polymerization stages will normally be conducted in different polymerization zones, that is in different reactors or different parts of the same reactor, the stages could be conducted sequentially in the same polymerization zone. The mixture of polymers is preferably produced in the same process or polymerization train.

A polymerization zone is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

For purpose of this invention a "semi-crystalline polymer" is defined to be an olefin polymer having a crystallinity of more than 5%, and an "amorphous" or "semi-amorphous polymer" is defined to be an olefin polymer having a crystallinity of 5% or less. Percent crystallinity is calculated using heat of fusion obtained from DSC as described in the Experimental section below. Olefin polymer is defined to mean a polymer comprising carbon and hydrogen, but not heteroatoms. A copolymer has two or more different monomers. By different, it is meant that the monomers differ in carbon number, such as in an ethylene-propylene copolymer, or differ in isomeric forms, such as isobutene and 1-butene. A homopolymer has one monomer type, such as homopolypropylene.

A foaming agent is a chemical material (such as compound or element) which when in fluid form (typically a gas) is used to form cell structures in polymeric materials, such as plastics, elastomers, thermoplastics, plastomers and in particular the blends of this invention. Foaming agents can form cell structures that are open cell, closed cell or a combination thereof. The foaming agent can be a solid or liquid that is combined with the polymer blend then triggered later, typically by heat, light, radiation, or pressure, to form the fluid (typically a gas) that expands the polymeric material and forms the cell structures. A foaming agent typically expands a polymeric material to a volume of at least 2 times the original volume prior to addition of the foaming agent and foaming, preferably at least 3 times the original volume, preferably at least 5 times the original volume, preferably at least 10 times the original volume, preferably at least 50 times the original volume, preferably at least 100 times the original volume, preferably 1000 times the original volume.

Room temperature is 23° C. unless otherwise noted. The unit "1/s" also referred to as "sec$^{-1}$" is seconds raised to the −1 power.

As used herein, the term "branched block copolymer" is defined as the cross product obtained when a first polymer chain (also referred as macromonomer) with reactive polymerizable chain ends (e.g., reactive termini) is incorporated into a second polymer chain during the polymerization of the latter to form a structure comprising a backbone defined by one of the polymer chains with branches of the other polymer chains extending from the backbone. Backbone and branches possess different and unique molecular structures, such as chemical composition and/or crystallinity. For example, a polypropylene homopolymer with vinyl chain ends can be incorporated into a propylene copolymer chain to form a branched cross-product with a propylene copolymer backbone and polypropylene side branches. Since the molecular structure/composition in the backbone and branches are different, the branched block composition typically has characteristics from both the backbone and the branches. The branched block products are also referred to as branched cross products. In one embodiment, the branches are comprised of homo-polypropylene and the backbone is comprised of propylene copolymers with at least one monomer selected from ethylene or C4 to C12 alpha olefin, preferably ethylene, butene, pentene, hexene, heptene, octene, nonene, decene, undecene, and dodecene. In another embodiment, both the backbone and branches in the branched block polymer are comprised of propylene copolymers, wherein the difference in crystallinity between the copolymers in backbone and branches is at least 5%, preferably at least 10%, more preferably at least 20%, relative to each other.

To effectively incorporate a reactive polymer chain into the growing chains of another polymer, it is preferable that the first polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. Vinyl terminated chains are generally more reactive than vinylene or vinylidene terminated chains. Generally, it is desirable that the first polymerization step produces a first polymer having at least 50%, such as at least 60%, for example, at least 70%, even at least 80% of vinyl terminal unsaturation based on the total unsaturated olefin chain ends. Unsaturated chain ends are determined using proton NMR (collection at 120° C., 400 MHz) as described in U.S. Ser. No. 12/143,663, filed Jun. 20, 2008, particularly the procedure described on page 33 line 25 to page 34 line 11.

A "propylene polymer" also referred to as a "propylene-containing polymer" is a polymer having at least 40 wt % propylene monomer, with the balance being made up by hydrocarbon monomers, preferably ethylene and/or C4 to C12 hydrocarbon monomers, preferably ethylene and/or C4 to C12 alpha olefins.

As used herein, the term "heterogeneous blend" means a composition having two or more morphological phases in the same state. For example, a blend of two polymers where one polymer forms discrete packets (or finely divided phase domains) dispersed in a matrix of another polymer is said to be heterogeneous in the solid state. Also, a heterogeneous blend is defined to include co-continuous blends where the blend components are separately visible, but it is unclear which is the continuous phase, and which is the discontinuous phase. Such morphology is determined using scanning electron microscopy (SEM) or atomic force microscopy (AFM). In the event the SEM and AFM provide different data, then the AFM data are used. By continuous phase is meant the matrix phase in a heterogeneous blend. By discontinuous phase is meant the dispersed phase in a heterogeneous blend. The finely divided phase domains are also referred as particles.

In contrast, a "homogeneous blend" is a composition having substantially one morphological phase in the same state. For example, a blend of two polymers, where one polymer is miscible with another polymer, is said to be homogeneous in the solid state. Such morphology is determined using AFM. By miscible it is meant that the blend of two or more polymers exhibits single-phase behavior for the glass transition temperature, e.g., the Tg would exist as a single, sharp transition temperature on a dynamic mechanical thermal analyzer (DMTA) trace of tan δ (i.e., the ratio of the loss modulus to the storage modulus) versus temperature. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

Polymer Blend

In another aspect, the present invention relates to a foamable thermoplastic in-reactor blend comprising:

(a) a first propylene-containing polymer component having 90 to 100 wt % propylene, 0 to 10 wt % comonomer (preferably selected from ethylene and C4 to C12 olefins), and a Tm of 120° C. or more (preferably 130° C. or more, preferably 135° C. or more, preferably 140° C. or more, preferably 150° C. or more);

(b) second propylene-containing polymer component having 30 to 90 wt % propylene, 10 to 70 wt % comonomer (preferably selected from ethylene and C4 to C12 olefins), and an Mw of 30,000 g/mol or more (preferably 50,000 g/mol or more, preferably 75,000 g/mol or more), said second polymer having a different crystallinity from the first polymer (and preferably having a different Tg); and wherein the polymer blend has:

(i) a Tm of 120° C. or more (preferably 130° C. or more, preferably 135° C. or more, preferably 140° C. or more, preferably 150° C. or more) as determined by DSC as described in the Experimental Section below;

(ii) a melt flow rate of 10 dg/min or more as determined by ASTM 1238, 230° C., 2.16 kg (preferably 20 dg/min or more, preferably 30 dg/min or more, preferably 40 dg/min or more);

(iii) a tensile strength at break of at least 8 MPa as determined by ASTM D1708 at 23° C. (preferably at least 10 MPa, preferably at least 12 MPa, preferably at least 15 MPa);

(iv) an elongation at break of at least 200% as determined by ASTM D1708 (preferably 300% or more, preferably 400% or more, preferably 500% or more);

(v) a ratio of elongational viscosity at break to linear viscosity at a strain rate of 1 sec$^{-1}$ of 5 or more (preferably 8 or more, preferably 10 or more, preferably 15 or more) when the elongational viscosity is measured at 180° C.; and (vi) optionally, a branched block product having peaks between 44 and 45 ppm in the $^{13}$C NMR spectrum; and when foamed, preferably with a foaming agent, the foamed article has a density of 800 kg/m$^3$ or less, preferably 400 kg/m$^3$ or less, preferably 300 kg/cm$^3$ or less.

By different crystallinities is meant that the percent crystallinities differ by at least 5% with respect to each other, preferably by at least 10%, preferably by at least 15%, preferably by at least 20%, preferably by at least 30%. Percent crystallinity is determined by DSC as described in the Experimental Section below. By different Tg's is meant that the Tg's differ by at least 5% with respect to each other, preferably at least 10%, preferably at least 20%, preferably by at least 30%. Tg is determined by DSC as described in the Experimental Section below.

Preferably the reactor blend has a heat of fusion (Hf) 80 J/g or less, more preferably 70 J/g or less. (Hf is determined by DSC as described in the Experimental Section below.) In another embodiment, the reactor blend has a heat of fusion 30 J/g or more, preferably 40 J/g or more. Alternatively, the reactor blend has a crystallinity of 50% or less, preferably 40% or less. In another embodiment, the reactor blend has a crystallinity of 15% or more, preferably 20% or more.

Preferably the in-reactor polymer blend has a tensile strength at break of 10 MPa or more (as determined by ASTM D1708 at 23° C.), preferably 15 MPa or more, preferably 20 MPa or more.

Useful blends described herein also show strain hardening in tensile strength. After the yield point, the blend undergoes a period of strain hardening, in which the stress increases again with increasing strain up to the ultimate strength in a stress-strain curve as measured according to ASTM D1708. Strain hardening is measured by a ratio of a stress at 300% of strain (M300) to the stress at 100% of strain (M100). The ratio of M300/M100 greater than 1 indicates strain hardening. The degree of strain hardening can also be measured using a ratio of M100 to a stress at 500% or 800% of strain. M500/M100 is defined as a ratio of the stress at 500% strain to the stress at 100% strain. Likewise, M800/M100 is defined as a ratio of the stress at 800% strain to the stress at 100% strain.

Preferred in-reactor polymer blends described herein have a M300/M100 strain hardening ratio greater than 1.0, preferably greater than 1.02, preferably greater than 1.04; and/or a M500/M100 strain hardening ratio greater than 1, preferably greater than 1.03, preferably greater than 1.05; and/or a M800/M100 strain hardening ratio greater than 1, preferably greater than 1.1, preferably greater than 1.2. Alternatively, the in-reactor polymer blend described herein have a strain hardening ratio Mx/M100 greater than 1.2, where Mx is the tensile strength at break.

Useful blends described herein also have a toughness (as measured by ASTM D1708) of 50 megajoule/m$^3$, preferably 60 megajoule/m$^3$, preferably 80 megajoule/m$^3$. Toughness is defined as the ability of polymer to absorb applied energy up to break. The area under the stress-strain curve is used as a measure of the toughness at room temperature.

Generally, the present in-reactor blends have a complex viscosity of 4000 Pa·s or less, preferably 3000 Pa·s or less, more preferably 2000 Pa·s or less, even more preferably 1500 Pa·s or less. The complex viscosity is measured at 190° C. over an angular frequency ranged from 0.01 to 100 rad/s using the procedure described in the Experimental Section for dynamic shear melt rheology.

Most thermoplastic polyolefins display pseudo-plastic flow behavior and their viscosity decreases with increasing shear rate (also termed shear thinning). This shear thinning behavior can be demonstrated by the decreasing complex viscosity with increasing shear rate. The inventive in-reactor polymer blends have good shear thinning. One way to quantify the shear thinning is to use a ratio of complex viscosity at a frequency of 0.01 rad/s to the complex viscosity at a frequency of 100 rad/s. Preferably, the complex viscosity ratio of the in-reactor polymer blend produced herein is 20 or more, more preferably 50 or more, even more preferably 100 or more when the complex viscosity is measured at 190° C.

Shear thinning can be also characterized using a shear thinning index. The term "shear thinning index" is determined using plots of the logarithm (base ten) of the dynamic viscosity versus logarithm (base ten) of the frequency. The slope is the difference in the log (dynamic viscosity) at a frequency of 100 rad/s and the log (dynamic viscosity) at a frequency of 0.01 rad/s divided by 4. These plots are the typical output of small amplitude oscillatory shear (SAOS) experiments. For propylene copolymers, a conventional SAOS test temperature is 190° C. Polymer viscosity is conveniently measured in poise (dyne-second/square centimeter) at shear rates within a range of from 0 to 100 rad/sec and at 190° C. under a nitrogen atmosphere using a dynamic mechanical spectrometer such as the Advanced Rheometrics Expansion System (ARES). Generally a low value of shear thinning index indicates a polymer is highly shear-thinning and that it is readily processable in high shear processes, for example by injection molding. The more negative this slope, the faster the dynamic viscosity decreases as the frequency increases. Preferably, the in-reactor polymer blend produced herein has a shear thinning index of less than −0.2. These types of polymer blends are easily processed in high shear rate fabrication methods, such as injection molding.

Useful blends described herein also have a characteristics of strain hardening in elongational viscosity. An important feature that can be obtained from elongational viscosity measurements is the attribute of strain hardening in the molten state. Strain hardening is observed as a sudden, abrupt upswing of the elongational viscosity in the transient elongational viscosity vs. time plot. This abrupt upswing, away from the behavior of a linear viscoelastic material, was reported in the 1960s for LDPE (reference: J. Meissner, Rheol. Acta., Vol. 8, 78, 1969) and was attributed to the presence of long branches in the polymer. The strain-hardening ratio is defined as a ratio of the elongational viscosity at break to the linear viscosity at a given strain rate. Strain hardening is defined when the ratio is greater than 1. In one embodiment, the inventive in-reactor polymer blends have strain-hardening in elongational viscosity. The strain-hardening ratio is 2 or greater, preferably 5 or greater, more preferably 10 or greater, and even more preferably 15 or more when elongational viscosity is measured at a strain rate of 1 $sec^{-1}$ and at a temperature of 180° C. Alternatively, the strain-hardening ratio is 2 or greater, preferably 5 or greater, more preferably 8 or greater, and even more preferably 12 or more when elongational viscosity is measured at a strain rate of 5 $sec^{-1}$ and at a temperature of 180° C.

Preferably the in-reactor polymer blend produced herein has a Shore hardness of 15A to 90D, such as 30A to 90D (as measured by ISO 868).

The in-reactor polymer blends described herein have a unique combination of easy flow and strong mechanical properties such as elongation, strain hardening; and tensile strength, and comprises a propylene-containing first polymer; a propylene-containing second polymer different in crystallinity from the first polymer by at least 5%, typically at least 10%; and a branched block copolymer having a backbone comprising the second polymer and branches comprising the first polymer. Preferably, the more crystalline material is employed as the first polymer and hence as the side branches of the branched block copolymer. Alternatively, a less crystalline material is employed as the first polymer and hence as the side branches of the branched block copolymer, characterized by a more crystalline backbone. For purposes of this invention a branched block copolymer having a backbone comprising the second polymer and branches comprising the first polymer is identified by $^{13}C$ NMR, as described below in the Example section.

The first and second polymers for the in-reactor polymer blend may each be selected from a propylene homopolymer, a semi-crystalline propylene copolymer and an amorphous propylene polymer, such as a thermoplastic elastomer of propylene. Any of the homopolymer, semi-crystalline propylene copolymer and amorphous propylene polymer (typically a propylene elastomer) can be used as either the branches or the backbone in the branched block composition.

In one embodiment, the first or the second polymer component is a propylene homopolymer. Preferably, the polypropylene is isotactic, highly isotactic, or highly syndiotactic polypropylene. As used herein, "isotactic" is defined as having at least 20% isotactic pentads, preferably having at least 40% isotactic pentads of methyl groups derived from propylene according to analysis by $^{13}C$ NMR. As used herein, "highly isotactic" is defined as having at least 60% isotactic pentads according to analysis by $^{13}C$ NMR (as described in the Experimental Section below). The propylene homopolymer can be used as either the first or second polymer, or as the side branches or backbone of the branched block copolymer, but generally is used as the first polymer, namely as the side branches of the branched block copolymer.

Particularly useful propylene homopolymers have a crystallinity of at least 30%, generally at least 40% as determined by differential scanning calorimetry (DSC) as described in the Experimental Section below. Useful propylene homopolymers typically have a heat of fusion greater than 60 J/g, alternatively at least 70 J/g, alternatively at least 80 J/g, alternatively at least 90 J/g, as determined by DSC analysis as described in the Experimental Section below. Suitable propylene homopolymers typically have a melting temperature of at least 100° C., generally at least 130° C., preferably at least 135° C., preferably at least 140° C., even at least 150° C.

Useful propylene homopolymers normally have a weight average molecular weight of less than 200,000 g/mol, such as 150,000 g/mol or less and a MFR of 2 dg/min or greater, conveniently 5 dg/min or greater, conveniently 10 dg/min or greater, particularly 20 dg/min or greater.

In another embodiment, a semi-crystalline propylene copolymer is employed as either the first or second polymers in the polymer blend and as either the backbone or side branches in the branched block structure. The propylene copolymer is generally made with a polymerization catalyst which forms essentially or substantially isotactic propylene sequences, but which introduces stereo- and regio-errors in the incorporation of propylene in the copolymer. Stereo errors are those where the propylene inserts in the chain with a tacticity that is not isotactic. Propylene molecules are usually added head-to-tail and not tail-to-tail or head-to-head. Head-to-tail addition results in a polypropylene chain with pendant methyl groups attached to alternating carbons. This alternating arrangement is disrupted when tail-to-tail or head-to-head addition occurs. A regio error is one where the propylene inserts with the methylene group or the methine group adjacent to a similar group in the propylene inserted immediately prior to it. Such errors are more prevalent after the introduction of comonomer, such as ethylene or 1-hexene, in the semi-crystalline propylene copolymer. While not wishing to be bounded by this theory, it is believed that the introduction of these errors in the propylene copolymer, particularly in the presence of comonomer, is important in the use of these propylene copolymers as the semi-crystalline propylene copolymer. Notwithstanding the presence of these errors, the semi-crystalline propylene copolymer is statistically random in the distribution of comonomer.

Typically, the semi-crystalline propylene copolymer is made with a single site metallocene catalyst that allows only a single statistical mode of addition of propylene and comonomer in a well-mixed, continuous monomer feed stirred tank polymerization reactor and that allows only a single polymerization environment for all of the polymer chains of the semi-crystalline propylene copolymer.

In another embodiment, the semi-crystalline propylene copolymer has blocky structure.

Suitable semi-crystalline propylene copolymers are formed by polymerizing propylene and at least one of comonomer selected from ethylene and C4 to C12 α-olefins, such as 1-butene; 1-pentene; 1-hexene; 1-heptene; 1-octene;

1-nonene; 1-decene; 2-methyl-1-propene; 3-methyl-1-pentene; 4-methyl-1-pentene; 5-methyl-1-hexene; and mixtures thereof. Copolymers of propylene with another α-olefin, such as 1-butene; 1-pentene; 2-methylpentene; 1,3-methyl-1-butene; 1-hexene; 3-methyl-1-pentene; 4-methyl-1-pentene; 3,3-dimethyl-1-butene; methyl-1-hexene; dimethyl-1-pentene; trimethyl-1-butene; ethyl-1-pentene; methyl-1-pentene; dimethyl-1-hexene; trimethyl-1-pentene; ethyl-1-hexene; methylethyl-1-pentene; diethyl-1-butene; propyl-1-pentene; methyl-1-nonene; 1-nonene; dimethyl-1-octene; trimethyl-1-heptene; ethyl-1-octene; methylethyl-1-butene; diethyl-1-hexene; and 1-dodecene, may also be used. Copolymers of propylene/ethylene and propylene/1-hexene are more preferred.

Preferred semi-crystalline propylene copolymers have a peak melting temperature from 10 to 170° C., typically from 30 to 150° C.; a weight averaged molecular weight of 200,000 g/mol or less, such as 150,000 g/mol or less; and a crystallization temperature of 0° C. or higher, typically 20° C. or higher. Moderate levels (5~10%) of crystallinity are also desirable for applications where elastic properties are important. Preferred semi-crystalline propylene copolymers have more than 5% crystallinity, preferably more than 10% crystallinity. Preferred semi-crystalline propylene copolymers have a weight average molecular weight of 20,000 g/mol or more, such as 50,000 g/mol or more.

In another embodiment, the first or the second polymer is an amorphous polymer (such as an amorphous thermoplastic elastomer). As used herein an amorphous polymer is defined to be an olefin polymer having a crystallinity of less than 5% as determined by DSC. Generally, the amorphous polymer is a propylene copolymer with at least one monomer selected from ethylene or C4 to C12 alpha-olefin, such as 1-butene; 1-heptene; 1-hexene; 1-octene; 1-decene; 2-methyl-1-propene; 3-methyl-1-pentene; 4-methyl-1-pentene; 5-methyl-1-hexene; and mixtures thereof. Copolymers of ethylene and propylene or ethylene or propylene with another α-olefin, such as 1-butene; 1-pentene; 2-methylpentene; 1,3-methyl-1-butene; 1-hexene; 3-methyl-1-pentene; 4-methyl-1-pentene; 3,3-dimethyl-1-butene; methyl-1-hexene; dimethyl-1-pentene; trimethyl-1-butene; ethyl-1-pentene; methyl-1-pentene; dimethyl-1-hexene; trimethyl-1-pentene; ethyl-1-hexene; methylethyl-1-pentene; diethyl-1-butene; propyl-1-pentene; methyl-1-nonene; 1-nonene; dimethyl-1-octene; trimethyl-1-heptene; ethyl-1-octene; methylethyl-1-butene; diethyl-1-hexene; and 1-dodecene, may also be used. Preferably the amorphous copolymer is the propylene/ethylene copolymer.

The amorphous nature of this component generally derives from the interruption of isotactic propylene sequences through comonomer incorporation and/or the presence of stereo- or regio-errors. The percentage of the copolymerized alpha-olefin in the amorphous copolymer is, in general, in a range of 2 to 50 wt %, alternatively 5% to 30 wt %. One, two, three or more alpha-olefins can be copolymerized with the propylene. In another embodiment, the amorphous polymer is a homopolymer such as atactic polypropylene.

Useful amorphous propylene polymers have a weight average molecular weight of 200,000 g/mol or less, such as 150,000 g/mol or less, for example 120,000 g/mol or less. Useful amorphous propylene polymers have a weight average molecular weight of 30,000 g/mol or more, such as 50,000 g/mol or more, for example 75,000 g/mol or more.

Any combination of the first and second polymer components preferably forms a population of branched block composition with a different molecular structure for the backbone from that of the side branches.

The foamable and foamed compositions of this invention typically utilize a foaming agent to cause expansion of the polymers by foaming.

Particularly preferred foaming agents include both physical foaming agents and chemical foaming agents. Chemical foaming agents include azodicarbonamide, azodiisobutyronitrile, benzenesulfonhydrazide, 4,4-oxybenzene sulfonylsemicarbazide, p-toluene sulfonyl semi-carbazide, barium azodicarboxylate, N,N'-dimethyl-N,N'-dinitrosoterephthalamide, and trihydrazino triazine.

Chemical foaming agents also include organic foaming agents including aliphatic hydrocarbons having 1-9 carbon atoms, halogenated aliphatic hydrocarbons, having 1-4 carbon atoms, and aliphatic alcohols having 1-3 carbon atoms. Aliphatic hydrocarbons include methane, ethane, propane, n-butane, isobutane, n-pentane, isopentane, neopentane, and the like. Chemical foaming agents include halogenated hydrocarbons, preferably fluorinated hydrocarbons. Examples of fluorinated hydrocarbon include methyl fluoride; perfluoromethane; ethyl fluoride; 1,1-difluoroethane (HFC-152a); 1,1,1-trifluoroethane (HFC-143a); 1,1,1,2-tetrafluoro-ethane (HFC-134a); pentafluoroethane; perfluoroethane; 2,2-difluoropropane; 1,1,1-trifluoropropane; perfluoropropane; perfluorobutane; and perfluorocyclobutane. Partially halogenated chlorocarbons and chlorofluorocarbons for use in this invention include methyl chloride; methylene chloride; ethyl chloride; 1,1,1-trichloroethane; 1,1-dichloro-1-fluoroethane (HCFC-141b); 1-chloro-1,1-difluoroethane (HCFC-142b); 1,1-dichloro-2,2,2-trifluoroethane (HCFC-123); and 1-chloro-1,2,2,2-tetrafluoroethane (HCFC-124). Fully halogenated chlorofluorocarbons include trichloromonofluoromethane (CFC-11); dichlorodifluoromethane (CFC-12); trichlorotrifluoroethane (CFC-113); dichlorotetrafluoroethane (CFC-114); chloroheptafluoropropane; and dichlorohexafluoropropane. Fully halogenated chlorofluorocarbons are not preferred. Aliphatic alcohols useful as foaming agents include methanol, ethanol, n-propanol, and isopropanol.

Suitable inorganic foaming agents useful in making the foams of the present invention include carbon dioxide, nitrogen, argon, water, air, nitrogen, and helium. Inorganic foaming agents also include sodium bicarbonate; sodium carbonate; ammonium bicarbonate; ammonium carbonate; ammonium nitrite; nitroso compounds, such as N,N'-dimethyl-N,N'-dinitrosoterephthalamide and N,N'-dinitrosopentamethylene tetramine; azo compounds, such as azodicarbonamide, azobisisobutylonitrile, azocyclohexylnitrile, azodiaminobenzene, and bariumazodicarboxylate; sulfonyl hydrazide compounds, such as benzene sulfonyl hydrazide, toluene sulfonyl hydrazide, p,p'-oxybis(benzene sulfonyl hydrazide), and diphenyl sulfone-3,3'-disulfonyl hydrazide; and azide compounds, such as calcium azide, 4,4'-diphenyl disulfonyl azide, and p-toluene sulfonyl azide.

The amount of foaming agent incorporated into the polymer composition (typically the polymer melt) to make a foam-forming polymer composition (typically a gel) is preferably from about 0.01 to about 10 wt % and most preferably from about 0.1 to 5 wt %, based on the total material in the blend. Level of foaming agent is often altered to obtain a desired foam density.

A foaming assistant can be used with the foaming agent. The simultaneous use of the foaming agent with a foaming assistant contributes to lowering of the decomposition temperature of the foaming agent, acceleration of decomposition and homogenization of bubbles. Examples of the foaming assistant may include organic acids such as salicylic acid, phthalic acid, stearic acid and nitric acid, urea and derivatives thereof. The amount of foaming assistant incorporated into the polymer composition (typically the polymer melt) is preferably from about 0.01 to about 10 wt % and most preferably from about 0.1 to 5 wt %, preferably 0.5 to 3 wt %, based on the total material in the blend.

In a preferred embodiment, the reactor blends of this invention comprise: (i) a first propylene polymer comprising 90 to 100 wt % (preferably 92 to 99 wt %, preferably 95 to 97 wt %) propylene and from 0 to less than 10 wt % (alternately 1 to 8 wt %, alternately 3 to 5 wt %) comonomer (preferably ethylene, butene, hexene or octene), said first propylene component having a melting point of 120° C. or more (preferably 130° C. or more, preferably 135° C. or more, preferably 140° C. or more, preferably 150° C. or more); (ii) a second propylene polymer comprising from 30 to 90 wt % (preferably 35 to 85 wt %, preferably 40 to 80 wt %) propylene and 70 to 10 wt % (preferably 65 to 15 wt %, preferably 60 to 20 wt %) comonomer (preferably ethylene, butene, hexene or octene), said second propylene polymer having an Mw of 30,000 g/mol or more, preferably 50,000 g/mol or more, preferably 75,000 g/mol or more; and (iii) 0.01 to 10 wt % (based upon the weight of the in reactor blend) foaming agent.

In a preferred embodiment, the first propylene polymer is a propylene homopolymer or random copolymer (e.g., up to 5 wt % comonomer) having melting point of 140° C. or more and the second propylene polymer is an amorphous copolymer of propylene and from 10 to 30 wt % ethylene, butene, hexene or octene, and has an mm triad tacticity index of 50% or less, preferably 40% or less, preferably 30% or less, preferably 20% or less. The mm triad tacticity is determined from a $^{13}C$ NMR spectrum of the polymer as described below and as described in U.S. Pat. No. 5,504,172. Preferred amorphous copolymers used in embodiments of the present invention may also have a propylene tacticity index (m/r) ranging from an upper limit of 1 to a lower limit of about 0.6, 0.4, or 0.3. The propylene tacticity index, expressed herein as "m/r", is determined by $^{13}C$ NMR. The propylene tacticity index m/r is calculated as defined in H. N. Cheng, *Macromolecules*, 17, 1950 (1984) and as described in U.S. Pat. No. 5,504,172. The designation "m" or "r" describes the stereochemistry of pairs of contiguous propylene groups, "m" referring to meso and "r" to racemic.

The ratio of the first polymer component to the second polymer component in the reactor blend depends on the requirements of the end-use applications. The thermal properties of the final in-reactor polymer blend depend on the properties of each component and the ratio of each component in the blend. Generally, the in-reactor blend has a crystallinity of 80% or less, typically 50% or less, as calculated using heat of fusion obtained from DSC analysis. A sum of the heat of fusion from all melting peaks is used when multiple melting peaks are present during a heating cycle. The heat of fusion for 100% crystallinity is selected from the homopolymer of the primary composition in the in-reactor polymer blend. For example, when the polymer blend is made of a propylene homopolymer and propylene/ethylene copolymer, propylene is the primary composition, and the heat of fusion of 100% crystallinity polypropylene is used (e.g., 189 J/g). In one embodiment, the in-reactor produced polymer blend has a heat of fusion between about 10 and about 70 J/g, for example between about 10 and about 60 J/g, such as between about 20 and about 50 J/g.

Conveniently, the in-reactor blend typically has a melting temperature of 120° C. or more, and generally 130° C. or more, such as 135° C. or more, such as 140° C. or more, for example 150° C. or more. The term "melting point," as used herein, for the in-reactor polymer blend, is the highest temperature peak among principal and secondary melting peaks as determined by DSC. In one embodiment of the present invention, the polymer has a single melting peak. Typically, a sample of in-reactor polymer blend will show secondary melting peaks adjacent to the principal peak, which peaks are considered together as a single melting peak. The highest peak temperature of these peaks is considered the melting point. The in-reactor polymer blend preferably has a melting point by DSC ranging from an upper limit of 170° C., 160° C., 140° C., 120° C., or 90° C., to a lower limit of 20° C., 30° C., 40° C., or 50° C.

Typically, the in-reactor blend has crystallization temperature of 130° C. or less. The term "peak crystallization temperature," as used herein, for the in-reactor polymer blend, is the highest temperature peak among the principal and secondary crystallization peaks as determined by DSC. In one embodiment of the present invention, the polymer has a single crystallization peak. When the crystallinity of the first and the second polymer components in the in-reactor blend is close, the polymer blend will show secondary crystallization peaks adjacent to the principal peak, which peaks are considered together as a single crystallization peak. The highest peak temperature of these peaks is considered the peak crystallization temperature. When the crystallinity of the first and the second polymer components in the in-reactor blend is far apart, the polymer blend will show two individual peaks for each component. The in-reactor polymer blend preferably has a crystallization temperature by DSC ranging from an upper limit of 120° C., 100° C., 90° C., 70° C., or 40° C., to a lower limit of 0° C., 10° C., 30° C., 40° C., or 70° C.

The melting temperatures of the polymer blend produced are thought to directly reflect the degree of crystallinity of the crystalline polymer component in the blend. The polymer blend can have a high melting temperature in a wide range of heat of fusion. In one embodiment, the polymer produced has a melting temperature of 135° C. or higher and a heat of fusion of 70 J/g or less, preferably 145° C. or higher and a heat of fusion of 60 J/g or less, more preferably 150° C. or higher and a heat of fusion of 50 J/g or less. Lower value of heat of fusion means softer materials. Alternatively, the inventive polymer blends have shore hardness from 30 A to 40 D and a melting temperature of 145° C. or higher.

Conveniently, the in-reactor blend has a weight average molecular weight of between 20,000 and 200,000 g/mol, such as between 30,000 and 150,000 g/mol with a polydispersity index (PDI=Mw/Mn) in the range of 1.5 to 40. The polydispersity index is partially determined by the catalysts and process condition employed in the polymerization process. For example, polymerization involving multiple catalysts may produce a copolymer with broader or multimodal molecular weight distribution. Multiple reactors with different polymerization conditions may produce polymer blend with multimodal molecular weight distributions. In one embodiment the polymer blend produced may have a unimodal, bimodal, or multimodal Mw/Mn. By bimodal or multimodal is meant that the Size Exclusion Chromatography (SEC) trace has more than one peak or inflection point. An inflection point is that point where the second derivative of the curve changes in sign (e.g., from negative to positive or vice versa).

The molecular weight of each component in the in-reactor blend can be optimized for a specific application. Generally, the molecular weight of the crystalline component should be greater than the entanglement molecular length, while the molecular weight of the less crystalline or amorphous component should be long enough so the crystalline component can bind the polymer segments together into a physical network in the solid state. When the molecular weight of the first polymer is low, the second polymer should have higher molecular weight to attain good mechanical strength.

The amount of the first polymer relative to the second polymer component may vary widely depending on the nature of the component polymers and intended end use of the polymer blend. In particular, however, one advantage of the present process is the ability to be able to produce a polymer blend in which the lower crystalline propylene copolymer comprises more than 20%, such as more than 50%, for example more than 70% of the total in-reactor polymer blend.

To determine the nature of the component polymers a polymer blend can be separated into fractions by solvent extraction (also referred as fractionation). A typical solvent is a saturated hydrocarbon such as hexane, cyclohexane, heptane or xylene. The extraction temperature can range from room temperature to the boiling point of the solvent. Polymers are easier to dissolve if they are pressed into a thin film and then cut into small pieces. They can also be milled into granules or powder prior to dissolving. For polymer blends containing homo-polypropylene, the polypropylene component can be separated using cyclohexane refluxing for 24 hours. The insoluble fraction comprises polypropylene and part of the branched block products. For in-reactor blends containing amorphous component, the amorphous component can be isolated by contacting the blend with cyclohexane at 25° C. for 48 hours. The soluble fraction comprises the amorphous component. Alternatively, a differential solvent fractionation of the in-reactor blend with several solvents of progressively increasing solubility and boiling point can provide several fractions. Nominally about 10 grams of the in-reactor blend is contacted with about 500 ml of cyclohexane in a thick-walled glass bottle with a screw cap closure. The sealed bottle is maintained at 25° C. for 48 hours. At the end of this period, the solution is decanted/filtered and evaporated to yield a residue of the polymer soluble to cyclohexane at 25° C. To the insoluble residue is added sufficient cyclohexane to bring the volume to about 500 ml and the bottle is then maintained at 30° C. for 48 hours. The soluble polymer is decanted/filtered and evaporated to yield a residue of the polymer soluble to cyclohexane at 30° C. In this manner, fractions of the in-reactor blends soluble at a temperature from 40° C. to 60° C. are obtained at temperature increases of approximately 5° C. between stages. Increases in temperature to over 100° C. can be accommodated if xylene, instead of cyclohexane, is used as the solvent. The temperature and temperature interval can be varied according to the distribution of the in-reactor blends.

Conveniently, the in-reactor blend has a cyclohexane refluxing insoluble fraction of 70 wt % or less, preferably 60 wt % or less. Alternatively, the in-reactor blend has a cyclohexane room temperature soluble fraction of 20 wt % or more, preferably 30 wt % or more, more preferably 40 wt % or more.

In one embodiment, the present in-reactor polymer blend has a fraction which elutes between 60 to 115° C. and a soluble fraction which elutes below 5° C. when fractionated using Crystallization analysis fractionation (CRYSTAF) using the procedure described in the Experimental Section. The fraction corresponding to the highest temperature peak is referred to as the high-crystalline fraction. The soluble fraction is therefore referred to as the amorphous elastomeric component. Depending on the crystallinity of the first and second polymers, as well as, the branched block composition, the peak temperature may be shifted or there may be additional peaks. Alternatively, a fraction elutes at temperature between 0 and 80° C. when a semi-crystalline propylene copolymer is present in the blend.

The presence of branched block structures can be detected using nuclear magnetic resonance spectroscopy (NMR). In $^{13}$C NMR, the polymers are dissolved in tetrachloroethane-d2 at 140° C. and the spectra are collected at 125° C. The peaks corresponding to methylenes adjacent to branch points are found between 44 and 45 ppm. Assignments for long chain branches of iPP chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For in-reactor polymer blends with low content of branched block composition, the blends should be first fractionated into components. Signals for the branched block components are found in the same fractions as the homo-polypropylene components. Preferred in-reactor polymer blends have 0.01 branches per 1000 carbon atoms (as determined by $^{13}$C NMR) or more, preferably 0.03 or more, preferably 0.05 or more, alternately from 0.01 to 2 branches per 1000 carbon atoms.

Branched block structures can be observed by Small Amplitude Oscillatory Shear (SAOS) testing of the molten polymer performed on a dynamic (oscillatory) rheometer. From the data generated by such a test, it is possible to determine the phase or loss angle $\delta$, which is the inverse tangent of the ratio of G" (the loss modulus) to G' (the storage modulus). For a typical linear polymer, the loss angle at low frequencies (or long times) approaches 90°, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45°. In contrast, a branched chain polymer relaxes very slowly, because the branches need to retract before the chain backbone can relax along its tube in the melt. This polymer never reaches a state where all its chains can relax during an oscillation, and the loss angle never reaches 90° even at the lowest frequency, w, of the experiments. The loss angle is also relatively independent of the frequency of the oscillations in the SAOS experiment; another indication that the chains can not relax on these timescales.

In a plot of the phase angle $\delta$ versus the measurement frequency $\omega$, polymers that have long chain branches exhibit a plateau in the function of $\delta(\omega)$, whereas linear polymers do not have such a plateau. According to Garcia-Franco et al. (Macromolecules 2001, 34, No. 10, 3115-3117), the plateau in the aforementioned plot will shift to lower phase angles $\delta$ when the amount of long chain branching occurring in the polymer sample increases. Dividing the phase angle at which the plateau occurs by a phase angle of 90°, one obtains the critical relaxation exponent n which can then be used to calculate a gel stiffness using the equation:

$$\eta^*(\omega)=S\Gamma(1-n)\omega^{n-1}$$

wherein $\eta^*$ represents the complex viscosity (Pa·s), $\omega$ represents the frequency, S is the gel stiffness, $\Gamma$ is the gamma function (see Beyer, W. H. Ed., CRC Handbook of Mathematical Sciences 5$^{th}$ Ed., CRC Press, Boca Rotan, 1978) and n is the critical relaxation exponent. Polymers produced herein preferably have a gel stiffness of more than 150 Pa·s, preferably at least 300 Pa·s and more preferably at least 500 Pa·s. The gel stiffness is determined at the test temperature of 190° C. A preferred critical relaxation exponent n for the polymers produced herein is less than 1 and more than 0, generally, n will be between 0.1 and 0.92, preferably between 0.2 and 0.85.

It was found that a resin having a relatively high melt elasticity is more readily expanded to a good quality foam having a high level of open cells. The elasticity of a polymer melt relative to its viscosity may be represented by tan δ, which is the ratio of the loss modulus (G" as measured by SAOS) to the storage modulus (G' as measured by SAOS). Since it is desirable to have a resin with relatively greater melt elasticity than viscosity, an in-reactor blend having a relatively small tan δ is preferred. In a preferred embodiment, the in-reactor blends produced herein have a tan δ of 2.0 or less, preferably 1.5 or less, more preferably 1.2 or less when tan δ is measured at an angular frequency of 100 rad/s and G' and G" are measured at 190° C.

Small amplitude oscillatory shear (SAOS) data can be transformed into discrete relaxation spectra using the procedure on pages 273-275 in R. B. Bird, R. C. Armstrong, and O. Hassager, *Dynamics of Polymeric Liquids, Volume 1, Fluid Mechanics, 2nd Edition,* John Wiley and Sons, (1987). The storage and loss moduli are simultaneously least squares fit with the functions:

$$G'(\omega_j) = \Sigma \eta_k \lambda_k \omega_j^2 / (1 + (\eta_k \omega_k)^2)$$

$$G''(\omega_j) = \Sigma \eta_k \lambda_k \omega_j / (1 + (\eta_k \omega_k)^2)$$

at the relaxation times $\lambda_k$=0.01, 0.1, 1, 10, and 100 seconds. The sums are from k=1 to k=5. The sum of the $\eta_k$'s is equal to the zero shear viscosity, $\eta_0$. An indication of high levels of branched block products is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$. For the polymers of this invention the viscosity fraction of the 100 second relaxation time is preferably at least 0.1, more preferably 0.4, and most preferably 0.8. In contrast, viscosity fractions of 100 second chains of conventional isotactic polypropylene are of the order of 0.10 or less and of conventional propylene/ethylene copolymers are of the order of 0.10 or less. Chains with long relaxation times can not relax during the cycle time of the small amplitude oscillatory shear experiment and lead to high zero shear viscosities.

The branched block composition in the present in-reactor blend can comprise a wide variety of structural compositions that allow the tuning of tensile properties over a wide range. While not wishing to be bounded by any theory, it is believed that in addition to the branched block structural composition, the crystalline polymers form hard inclusions (or crystallites) within a soft matrix so physical crosslinks form in the polymer blend. The presence of physical crosslink promotes tensile properties. To be effective, the high crystalline hard inclusions are preferably multi-blocks with low crystalline or amorphous chain segments. The low crystalline or amorphous chain segments should be long enough to span the distance between two hard inclusions or entangle with other chain segments from other hard inclusions.

In one embodiment, the side branch and backbone components are immiscible so that the blend has a heterogeneous morphology. One advantageous heterogeneous blend comprises the lower crystallinity polymer component in dispersed phase and the higher crystallinity polymer in the continuous phase. For some applications, the blends have a wide range in morphology as the components of greater and lesser crystallinity can also be co-continuous. Alternatively, the in-reactor blend can have a heterogeneous morphology with the higher crystalline component in a dispersed phase and the lesser crystalline component in a continuous phase. In any event, the sizes of the individual domains of the dispersed phase are very small with the smallest length dimension for the dispersed phase typically being less than 5 μm, such as less than 2 μm, even less than 1 μm without any compatibilizer added. While not wishing to be restrained by any theory, we believe that the reason for the small domain size is the presence of branched block composition which has the attributes of both the first polymer and the second polymer component. In particular, we believe that such a molecule containing segments of each of the polymeric components acts like compatibilizer in the in-reactor blend. The presence of branched block composition enables immiscible components in the blend to be compatible to the extent that no compatibilizer is needed in order to attain and retain this fine morphology. Presence of fine particles of the dispersed phase generally allows dispersion of higher amounts of the dispersed phase in a polymer matrix, stabilizes the obtained morphology by preventing coalescence of the dispersed particles, and enhances mechanical properties of the blend. This also allows the production of softer in-reactor polymer blends.

Alternatively, the components on the side branches and backbone, as well as individual components in the in-reactor blend are miscible. The in-reactor produced polymer blend then has homogeneous morphology. When all the individual components are capable of crystallizing to a limited extent, they are at least partially co-crystallized.

In one practical embodiment, the present reactor blend includes a branched block copolymer in which the branches are comprised of a propylene homopolymer and the backbone is comprised of a propylene copolymer with at least one monomer selected from ethylene or C4 to C12 alpha olefin. In another embodiment, both the backbone and branches in the branched block polymer are comprised of propylene copolymers, wherein the difference in crystallinity between the copolymers in backbone and branches is at least 5%, such as at least 10%, for example, at least of 20%.

The in-reactor polymer blends described herein can be produced using any appropriate polymerization techniques used in the art. Typically, the in-reactor polymer blends described herein can be produced using the processes described in U.S. Ser. No. 12/335,252 filed Dec. 15, 2008, which is incorporated by reference herein. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable.

Particularly preferred transition metal compounds for producing polymer blends useful herein are racemic metallocenes, such as rac-dimethylsiladiyl(2-isopropyl,4-phenyl-indenyl)$_2$ zirconium dichloride; rac-dimethylsiladiyl(2-isopropyl,4-[1-naphthyl]indenyl)$_2$ zirconium dichloride; rac-dimethylsiladiyl (2-isopropyl,4-[3,5-dimethylphenyl] indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichloride; rac dimethylsiladiyl bis-(2-methyl, 4-napthylindenyl) zirconium dichloride; rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride; rac-diphenylsiladiyl(2-methyl-4-[1-naphthyl]indenyl)$_2$ zirconium dichloride; and rac-biphenyl siladiyl(2-isopropyl, 4-[3,5 di-t- butyl-phenyl]indenyl)$_2$ zirconium dichloride. Alkylated variants of these metallocenes (e.g., di-methyl instead of dichloride) are also contemplated, typically indicated by the choice of catalyst activation system. These and other metallocene compositions are described in detail in U.S. Pat. Nos. 6,376,407; 6,376,408; 6,376,409; 6,376,410; 6,376,411; 6,376,412; 6,376,413; 6,376,627; 6,380,120; 6,380,121; 6,380,122; 6,380,123; 6,380,124; 6,380,330; 6,380,331; 6,380,334; 6,399,723; and 6,825,372. These catalyst compounds can be activated by alumoxanes or non-coordinating anion activators such as those described at pages 30 to 34 of U.S. Ser. No. 12/335,252. Preferred activators include methyl alumoxane; modified methylalumoxane; N,N-dimethylanilinium tetra(perfluorophenyl)borate; N,N-dimethylanilinium tetrakis(perfluoronapthyl)borate; N,N-dimethylanilinium tetrakis(perfluorobiphenyl)borate; N,N-dimethylanilinium tetrakis(3,5-bis(trifluoromethyl)phenyl)borate; triphenylcarbenium tetrakis(perfluoronapthyl)borate; triphenylcarbenium tetrakis(perfluorobiphenyl)borate; triphenylcarbenium tetrakis(3,5-bis(trifluoromethyl)phenyl)borate; and triphenylcarbenium tetra(perfluorophenyl)borate.

Particularly preferred catalysts also include N-bonded carbazol-9-yl substituted bridged bis-indenyl metallocene compounds such as rac-dimethylsilylbis(2-methyl-4-carbazolyl-indenyl)zirconium dimethyl. These compositions are described in detail in U.S. Pat. No. 7,812,104, which is incorporated by reference herein.

Particularly useful catalyst/activator combinations include rac-dimethylsilyl bis(2-methyl-4-phenylindenyl)zirconium dimethyl activated with methyl alumoxane or N,N-dimethyl anilinium tetrakis(perfluoronaphthyl)borate.

Additives

The in-reactor polymer blend described herein may optionally be combined with one or more additives known in the art, such as reinforcing and non-reinforcing fillers, scratch resistant agents, plasticizers, antioxidants, heat stabilizers, extender oils, lubricants, antiblocking agents, antistatic agents, anti-fogging agents, waxes, pigments, flame/fire retardants, dyes and colorants, and ultraviolet absorber. Other additives include, for example, vulcanizing or curative agents, vulcanizing or curative accelerators, cure retarders, processing aids, tackifying resins, and other processing aids known in the polymer compounding art. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired. The aforementioned additives may be either added independently or incorporated into an additive or master batch. Such additives may comprise up to about 70 wt %, more preferably up to about 50 wt %, of the total composition.

Fillers and extenders, which can be utilized, include conventional or nanosized inorganics such as calcium carbonate, clays, silica, talc, titanium dioxide, carbon black, mica, silicate, combinations thereof, and the like. Extender oils and plasticizers may also be used. The rubber processing oils generally are paraffinic, naphthenic or aromatic oils derived from petroleum fractions.

The foaming agent may be incorporated or mixed into the polymer melt by any means known in the art such as with an extruder, mixer, or blender. The foaming agent is typically mixed with the polymer melt at conditions (such as an elevated pressure) sufficient to prevent substantial expansion of the melt polymer material and to generally disperse the foaming agent homogeneously therein. Optionally, a nucleator may be blended in the polymer melt or dry blended with the polymer material prior to plasticizing or melting.

It is also known to add small amounts of particulate solid materials to the polymer prior to foaming, wherein the particulate solid materials act as seeds to promote the formation of the cells. The particulate solid material has preferably an average particle size of 0.1 μm to 200 μm, in particular 1 μm to 50 μm. Any particulate solid material may be used, such as chalk, talc, silica etc. Preferably, talc is used. Useful amounts of particulate can be up to 5 wt %, based on the total material in the blend (preferably from 0.01 to 5 wt %, preferably 0.1 wt % to 4 wt %). In a particularly preferred embodiment, 1 to 3 wt % (more preferably about 2 wt %) of talc is used to make a high melt strength foam in an extruder.

The blends of this invention may also comprise slip agents or mold-release agents to facilitate moldability, and are preferably present at 50 ppm to 10 wt %, more preferably 50 to 5000 ppm, even more preferably 0.01 to 0.5 wt % (100 to 5000 ppm), even more preferably 0.1 to 0.3 wt % (1000 to 3000 ppm), based upon the weight of the composition. Desirable slip additives include, but are not limited to, saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; stearates such as zinc stearate; and mixtures thereof. Preferred slip additives are unsaturated fatty acid amides, which are available from Crompton (Kenamide™ grades) and Croda Universal (Crodamide™ grades). Particularly preferred are the erucamide and oleamide versions of unsaturated fatty acid amides. Preferred slip agents also include amides having the chemical structure $CH_3(CH_2)_7 CH=CH(CH_2)_xCONH_2$ where x is 5 to 15. Particularly preferred amides include: 1) $CH_3(CH_2)_7CH=CH(CH_2)_{11}CONH_2$ which may also be referred to as Erucamide or cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8CONH_2$; and 3) Oleamide which may also be preferred to as N-9-octadecenyl-hexadecanamide, $CH_3(CH_2)_7 CH=CH(CH_2)_7CONH_2$. In another embodiment, stearamide is also useful in this invention. Other preferred slip additives include those described in WO 2004/005601A1.

The polymer additives can also include a nanocomposite, which is a blend of polymer with one or more organo-clays. Illustrative organo-clays can include one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines, or sulfides. Further, the organo-clay can be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, and/or florine mica.

When present, the organo-clay is preferably included in the nanocomposite at from 0.1 to 50 wt %, based on the total weight of the nanocomposite. The stabilizing functionality may be selected from one or more of phenols, ketones, hindered amines, substituted phenols, substituted ketones, substituted hindered amines, and combinations thereof. The nanocomposite can further comprise at least one elastomeric ethylene-propylene copolymer, typically present in the nanocomposite at from 1 to 70 wt %, based on the total composition.

The additives, such as fillers and oils, can be introduced into the in-reactor polymer blend during the polymerization in either the first polymerization zone or the second polymerization zone. The additives can be added into the effluent from the second polymerization zone but are preferably added into the polymer blend after removal of solvent or diluent through melt blending.

In another embodiment, the blends have less than 5 wt % filler, based on the weight of the polymers and the filler.

Additional polymers can also be added into the in-reactor polymer blend. In one or more embodiments, the additional polymers include thermoplastic resins or thermoplastic elastomers. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or alpha-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another alpha-olefin such as 1-butene, 1-hexene, 1-octene, 2-methyl-1-propene, 3-methyl-1-pentene, 4-methyl-1-pentene, 5-methyl-1-hexene, or mixtures thereof are also contemplated. Specifically included are the homo-polypropylene, impact, and random copolymers of propylene with ethylene or the higher alpha-olefins, described above. Preferably, the homo-polypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1 to about 30% by weight of the polymer (See, for example, U.S. Pat. Nos. 6,268,438; 6,288,171; and 6,245,856). Copolymers available under the trade name VISTAMAXX™ (ExxonMobil, Houston Tex.) are specifically included. Blends or mixtures of two or more polyolefin thermoplastics such as described herein, or with other polymeric modifiers, are also suitable in accordance with this invention. These homo-polymers and copolymers may be synthesized by using an appropriate polymerization technique known in the art, such as, but not limited to, the conventional Ziegler-Natta type polymerizations, and catalysis employing single-site organometallic catalysts including, but not limited to, metallocene catalysts.

Foam Articles

The inventive polymer blends can be processed in similar ways as any other polyolefins useful in foaming processes. The foam composition can be produced by a number of methods, such as compression molding, injection molding and hybrids of extrusion and molding. The process can comprise mixing the polymers under heat to form a melt, along with foaming agents and other typical additives, to achieve a homogeneous or heterogeneous compound. The ingredients may be mixed and blended by any means known in the art, such as with a Banbury, intensive mixers, two-roll mill, and extruder. Time, temperature, and shear rate may be regulated to ensure optimum dispersion without premature foaming. A high temperature of mixing may result in premature foaming by decomposition of foaming agents or cell collapse due to lack of stabilization of the structure. When the melt temperature is too low, foaming is limited because the material solidifies before the cells have the possibility to expand fully. An adequate temperature is desired to insure good mixing of polymers and the dispersion of other ingredients. The upper temperature limit for safe operation may depend on the onset decomposition temperatures of foaming agents employed. The decomposition temperature of some foaming agents is lower than the melt temperature of the polymer. In this case, the polymers may be melt-blended before compounded with other ingredient(s). The resultant mixture can be then compounded with the ingredients. Extruders with staging cooling/heating can be also employed. The latter part of the foam extruder is dedicated to the melt cooling and intimate mixing of the polymer-foaming agent system. After mixing, shaping can be carried out. Sheeting rolls or calendar rolls are often used to make appropriately dimensioned sheets for foaming. An extruder may be used to shape the composition into pellets. Foaming can be carried out in a compression mold at a temperature and time to complete the decomposition of foaming agents. Pressures, molding temperature, and heating time may be controlled. Foaming can be carried out in an injection molding equipment by using foam composition in pellet form. The resulting foam can be further shaped to the dimension of finished products by any means known in the art, such as by thermoforming and compression molding.

Optionally, a nucleating agent is blended in the polymer melt. The feeding rate of foaming agent and nucleator are adjusted to achieve a relatively low density foam and small cell size, which results in a foam having thin cell walls.

Polyolefin foams are commonly made by an extrusion process that is well known in the art. Preferably, the extruders are longer than standard types, typically with an overall L/D ratio>40, in either a single or tandem extruder configuration. Melt temperature is one of the most important process parameters in foam extrusion. Preferably, the melt temperature is in a range from approximately 130° C. to 180° C.

In particular, the in-reactor polymer blends described herein are intended for use in producing injection molded components for automobiles, such as door panels, consoles, armrests, dashboards, seats, and headliners; especially where the component includes a foamed core covered by a soft-feeling, but scratch resistant, skin. Such components can be formed by employing separate injection molding operations to produce the core and the skin or may be produced in a single injection molding operation using commercially available multi-shot injection machinery.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

Foam material of the invention preferably has a void volume of at least about 5%, more preferably at least about 10%, more preferably at least about 15%, more preferably still at least about 20%, and more preferably still at least about 30% Such void volume allows significant reduction in consumption of polymeric material. In another set of embodiments the material has a void volume of at least about 50%, more preferably at least about 60%, more preferably at least about 70%, and more preferably still at least about 75%. Void volume, in this context, means initial void volume, i.e., typically void volume immediately after extrusion and cooling to ambient conditions. Void volume is calculated from the foam density determined according to ASTM D1622-08.

The foam articles produced using the blends described herein typically have a density of 800 kg/m$^3$ or less, preferably 600 kg/m$^3$ or less, more preferably 400 kg/m$^3$, even more preferably 200 kg/m$^3$ or less. Foam density is determined according to ASTM D1622-08.

Alternatively, the foam articles produced using the blends described herein typically have greater than 20% open cell and preferably from about 30 to about 70% open cell according to ASTM D2856-A.

In another embodiment, the foam articles produced using the blends described herein typically have 50% or more, preferably 70% or more, more preferably 80% or more closed cells according to ASTM D2856-A.

The foam articles produced using the blends described herein typically have an average cell size of about 3 mm or less, preferably about 2 mm or less, preferably 1 mm or less according to ASTM D3576-04. Alternatively, the cell size is between 10 μm to 10 mm, preferably from 100 μm to 5 mm.

Another unique feature of the foam articles produced using the blends described herein, is a broad application (or end-use) temperature range. In one embodiment, the application temperature is between −40 to 160° C., preferably from −30 to 150° C., more preferably from −20 to 140° C. The in-reactor blend comprises the high crystallinity propylene copolymer component which has a melting point of greater than 140° C. and low crystallinity propylene copolymer component which has a glass transition temperature as low as −50° C. The branch-block cross products possess the characters derived from both the high and low crystallinity propylene copolymer such as low glass transition temperature from low crystallinity component and high melting temperature from high crystallinity polypropylene segments.

Use of the Foam Article

The compositions of this invention may be used in any known application involving molding or extrusion, including consumer goods, industrial goods, construction materials, packaging materials, and automotive parts. For examples, the foam articles can be used as weather seals for the automotive industry, where the object is to reduce road noise, dust, grit, and moisture intake at the various openings, such as window seals, door seals, and trunk seals. The elastomeric characteristics of the in-reactor blend foam allow it to conform to the shapes needed and to be effectively compressed into gaps and corners at the openings of the automotive openings when they are closed such that compressed foam hinders the entry of the noise, dust, and moisture.

In the case of food packaging, PP foam offers a lightweight packaging solution with excellent grease/fat/oil resistance. Its high heat stability means products are microwaveable, with good thermal insulation giving them a 'cool touch' during removal.

In automotive applications, lightweight foam solutions are helping to improve vehicle performance and fuel efficiency. With increasing pressure for end-of-life vehicle recycling, mono-material solutions are being sought and with PP becoming a preferred polymer, recyclable foamed PP solutions are a logical next step. PP foams have an excellent moisture barrier and chemical resistance which are important for durability and functionality in the presence of hot oil, grease, or fuel. Its high heat stability also opens up the possibility for under the hood applications.

The inventive foamable in-reactor blends are also useful to interior parts of automotives such as instrument panels, door trim panels, and side pillars. The automotive industry is moving away from parts requiring multi-step processes and manual assembly to simpler systems that employ advanced tools such as multi-shot injection molding machinery that allows parts integration. Automotive parts that involve the production of skin foam systems over hard substrates are often assembled step-by-step using various types of materials. Reactor products can provide the desired functionality, such as foam characteristics at a lower manufacturing and assembly cost.

In another embodiment, this invention relates to

1. A foamable thermoplastic in-reactor blend comprising:

(i) a first propylene polymer component comprising 90 to 100 wt % (preferably 92 to 99 wt %, preferably 95 to 97 wt %) propylene and from 0 to less than 10 wt % (alternately 1 to 8 wt %, alternately 3 to 5 wt %) comonomer (preferably ethylene, butene, hexene or octene), said first propylene polymer having a melting point of 120° C. or more (preferably 130° C. or more, preferably 135° C. or more, preferably 140° C. or more, preferably 150° C. or more); and (ii) a second propylene polymer component comprising from 30 to 90 wt % (preferably 35 to 85 wt %, preferably 40 to 80 wt %) propylene and 70 to 10 wt % (preferably 65 to 15 wt %, preferably 60 to 20 wt %) comonomer (preferably ethylene, butene, hexene, or octene), said second propylene polymer having an Mw of 30,000 g/mol or more, preferably 50,000 g/mol or more, preferably 75,000 g/mol or more;

where said second propylene-containing polymer has a crystallinity different by at least 5% (preferably by at least 10%, preferably by at least 15%, preferably by at least 20%, preferably by at least 30%) from the first polymer and optionally the first propylene-containing polymer and the second propylene-containing have Tg's that differ by at least 5% with respect to each other (preferably at least 10%, preferably at least 20%, preferably by at least 30%); where the in reactor polymer blend is preferably combined with foaming agent (preferably 0.01 to 10 wt %, based upon the weight of the in reactor polymer blend, preferably 0.1 to 5 wt %, preferably 0.5 to 3 wt %); and wherein, prior to combination with the foaming agent, the polymer blend has:

(a) a Tm of at least 120° C. (preferably 130° C. or more, preferably 135° C. or more, preferably 140° C. or more, preferably 150° C. or more);

(b) a melt flow rate of 10 dg/min or more (preferably 20 dg/min or more, preferably 30 dg/min or more, preferably 40 dg/min or more);

(c) a tensile strength at break of at least 8 MPa (preferably at least 10 MPa, preferably at least 12 MPa, preferably at least 15 MPa);

(d) an elongation at break of at least 200% (preferably 300% or more, preferably 400% or more, preferably 500% or more); and (e) a ratio of elongational viscosity at break to linear viscosity at a strain rate of 1 sec$^{-1}$ of 5 or more (preferably 8 or more, preferably 10 or more, preferably 15 or more, alternately 30 or more when the elongational viscosity is measured at a strain rate of 1 sec$^{-1}$ and 180° C., and where when the blend is foamed, the foamed article has a density of 800 kg/m³ or less (preferably 600 kg/m³ or less, preferably 500 kg/cm³ or less, preferably 400 kg/m³ or less, preferably 300 kg/cm³ or less, preferably 200 kg/m³ or less).

2. The foamable thermoplastic in-reactor polymer blend of paragraph 1, wherein the foaming agent includes one or more of azodicarbonamide, azodiisobutyro-nitrile, benzenesulfonhydrazide, 4,4-oxybenzene sulfonylsemicarbazide, p-toluene sulfonyl semi-carbazide, barium azodicarboxylate, N,N'-dimethyl-N,N'-dinitrosoterephthalamide, trihydrazino triazine, methane, ethane, propane, n-butane, isobutane, n-pentane, isopentane, neopentane, methyl fluoride, perfluoromethane, ethyl fluoride, 1,1-difluoroethane, 1,1,1-trifluoroethane, 1,1,1,2-tetrafluoro-ethane, pentafluoroethane, perfluoroethane, 2,2-difluoropropane, 1,1,1-trifluoropropane, perfluoropropane, perfluorobutane, perfluorocyclobutane, methyl chloride, methylene chloride, ethyl chloride, 1,1,1-trichloroethane, 1,1-dichloro-1-fluoroethane, 1-chloro-1,1-difluoroethane, 1,1-dichloro-2,2,2-trifluoroethane, 1-chloro-1,2,2,2-tetrafluoroethane, trichloromonofluoromethane, dichlorodifluoromethane, trichlorotrifluoroethane, dichlorotetrafluoroethane, chloroheptafluoropropane, dichlorohexafluoropropane, methanol, ethanol, n-propanol, isopropanol, carbon dioxide, nitrogen, argon, water, air, nitrogen, helium, sodium bicarbonate, sodium carbonate, ammonium bicarbonate, ammonium carbonate, ammonium nitrite, N,N'-dimethyl-N,N'-dinitrosoterephthalamide, N,N'-dinitrosopentamethylene tetramine, azodicarbonamide, azobisisobutylonitrile, azocyclohexylnitrile, azodiaminobenzene, bariumazodicarboxylate, benzene sulfonyl hydrazide, toluene sulfonyl hydrazide, p,p'-oxybis(benzene sulfonyl hydrazide), diphenyl sulfone-3,3'-disulfonyl hydrazide, calcium azide, 4,4'-diphenyl disulfonyl azide, and p-toluene sulfonyl azide.

3. The foamable thermoplastic in-reactor polymer blend of paragraph 1 or 2, wherein a foaming assistant (preferably salicylic acid, phthalic acid, stearic acid, nitric acid, urea or a derivatives thereof) is used with the foaming agent (preferably 0.01 to 10 wt %, based upon the weight of the in reactor polymer blend, preferably 0.1 to 5 wt %, preferably 0.5 to 3 wt %).

4. The foamable thermoplastic in-reactor polymer blend of any of paragraphs 1, 2 or 3, wherein the blend further comprises particulate solid (preferably up to 5 wt %, preferably from 0.01 to 5 wt %, preferably 0.1 wt % to 4 wt %), preferably having an average particle size of 0.1 µm to 200 µm, in particular 1 µm to 50 µm, preferably particulate solid is one or more of talc, silica, chalk or a nano clay.

5. The foamable thermoplastic in-reactor polymer blend of any of paragraphs 1 to 4, wherein when the blend is foamed, the foam has 50% or more closed cell structure (preferably 70% or more, more preferably 80% or more).

6. The foamable thermoplastic in-reactor polymer blend of any of paragraphs 1 to 5, wherein when the blend is foamed the foam has an averaged cell size of 3 mm or less (preferably about 2 mm or less, preferably 1 mm or less, alternatively, the cell size is between 10 µm to 10 mm, preferably from 100 µm to 5 mm).

7. The foamable thermoplastic in-reactor polymer blend of any of paragraphs 1 to 6, wherein the polymer blend has a heat of fusion of 30 J/g or more, preferably 40 J/g or more.

8. The foamable thermoplastic in-reactor polymer blend of any of paragraphs 1 to 7, wherein the polymer blend has a heat of fusion of 80 J/g or less, preferably 70 J/g or less.

9. The foamable thermoplastic in-reactor polymer blend of paragraph 1, wherein the polymer blend has a complex viscosity of 4000 Pa·s or less (preferably 3000 Pa·s or less, more preferably 2000 Pa·s or less, even more preferably 1500 Pa·s or less), where the complex viscosity is measured at 190° C. over an angular frequency range of 0.01 to 100 rad/s.

10. The foamable thermoplastic in-reactor polymer blend of paragraph 1, wherein the polymer blend has a ratio of elongational viscosity at break to the linear viscosity of 3 or more (alternately 5 or more, alternately 10 or more) when the elongational viscosity is measured at a strain rate of 5 sec$^{-1}$ and a temperature of 180° C.

11. A process for producing a foamed polyolefin article, comprising (a) mixing foaming agent and molten foamable blend of any of paragraphs 1 to 10; (b) treating said foamable mixture so that said foaming agent expands within said mixture to produce a foam; and (c) obtaining a foamed article having has a density of 800 kg/m³ or less.

12. The process of paragraph 11, wherein the molten foamable mixture is heated or pressurized to cause foaming.

13. The process of paragraph 11, wherein the molten foamable mixture is extruded or molded.

14. A foam article comprising a foamed in-reactor blend of any of paragraphs 1 to 10, or the product of the process of any paragraphs 11, 12, or 13.

15. Use of foam articles of paragraph 14, as an automotive part.

The invention will now be more particularly described with reference to the accompanying non-limiting Examples.

EXPERIMENTAL SECTION

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided, however, that a value of 189 J/g is used as the heat of fusion for 100% crystalline polypropylene, a value of 290 J/g is used for the heat of fusion for 100% crystalline polyethylene. The melting and crystallization temperatures reported here were obtained during the first cooling/second heating cycle unless otherwise noted.

For polymers displaying multiple endothermic and exothermic peaks in the first cooling and second heating cycle, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was ~4 N/m with a resonance frequency of ~70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

The morphologies of the various samples were also examined using a scanning electron microscope (SEM, JSM-840). For the blends, the samples were first microtomed in liquid nitrogen, then the surfaces were etched in heptane at room temperature for different time ranging from 30 seconds to 48 hours depending on the blend composition to remove the elastomer phase for SEM observation. For the foams, the inspected surfaces were freeze-fractured in liquid nitrogen, and then directly observed by SEM.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the area under propylene band at ~1165 $cm^{-1}$ and the area of ethylene band at ~732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. The ethylene content in wt. % was calculated according to the following equation:

$$\text{ethylene content (wt.\%)} = 72.698 - 86.495X + 13.696X^2$$

where $X = AR/(AR+1)$ and AR is the ratio of the area for the peak at ~1165 $cm^{-1}$ to the area of the peak at ~732 $cm^{-1}$.

In conducting the $^{13}C$ NMR investigations, samples were prepared by adding about 0.2~0.4 g sample to approximately 3 ml of deuterated tetrachloroethane in a 10-mm diameter NMR tube. The samples were dissolved and homogenized by heating the tube and its contents to 140° C., and then the sample solution was placed into an NMR spectrometer with the probe temperature set to 125° C. The data were collected using a Varian Unity Plus® 400 MHz spectrometer, corresponding to a $^{13}C$ resonance frequency of 100.5 MHz. The data were acquired using 4000 transients per data file with a 6 second pulse repetition delay. To achieve maximum signal-to-noise ratio for quantitative analysis, multiple data files were added together. The spectral width is 25,000 Hz with a minimum file size of 32K data points.

For 1-hexene content, interpretation of the data is based in part on peak assignments provided by Kissin and Brandolini (Macromolecules, 24, 2632, (1991)), Folini, et al., (Macromol. Chem. Phys., 201, 401, 2000) and Resconi, et al., (Chem. Rev., 100, 1253, 2000). Instrument measured integral intensities were used to determine sample composition.

The presence of branched block structures in the present in-reactor polymer blends can be detected using nuclear magnetic resonance spectroscopy ($^{13}C$ NMR). Some of the vinyl groups on the chain ends of polymers in both the first and second polymerizations can insert to make branched block structures. These long chain branches are of the "Y" type, where three chains meet at a single methine carbon. The peaks corresponding to methylenes adjacent to these branch points are found between 44 and 45 ppm. Assignments for long chain branches of polypropylene chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For ethylene long chain branches in ethylene, Randall (*Polymer Reviews* 29 (2), pp. 201-317, (1989)) describes a method to measure them. In the polymers of this invention long chain branches between ethylene/propylene chains and isotactic polypropylene chains have been found at 44.68, 44.83, 44.92 ppm.

Molecular weights (number average molecular weight (Mn), weight average molecular weight (Mw), and z-average molecular weight (Mz)) were determined using a Polymer Laboratories Model 220 high temperature SEC with on-line differential refractive index (DRI), light scattering, and viscometer detectors (also referred to as GPC-3D). Three Polymer Laboratories PLgel 10 m Mixed-B columns were used for separation using a flow rate of 0.54 ml/min and a nominal injection volume of 300 µL. The detectors and columns were contained in an oven maintained at 135° C. The light scattering detector was a high temperature miniDAWN (Wyatt Technology, Inc.). The primary components were an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer was a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer was inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Crystallization analysis fractionation (CRYSTAF) was conducted using a CRYSTAF 200 unit commercially available from PolymerChar, Valencia, Spain. The sample was dissolved in 1,2 dichlorobenzene at 160° C. at a polymer concentration of about 0.2 to 1.0 mg/ml for about 1 hour and stabilized at 95° C. for about 45 minutes. The sampling temperatures ranged from 95 to 30° C. or 95 to 0° C. at a cooling rate of 0.2° C./min. An infrared detector was used to measure the polymer solution concentrations. The cumulative soluble concentration was measured as the polymer crystallized while the temperature was decreased. The analytical derivative of the cumulative profile reflects the crystallinity distribution of each polymer components of the in-reactor polymer blends. The CRYSTAF peak temperature and area were identified by the peak analysis module included in the CRYSTAF Software. The CRYSTAF peak finding routine identifies a peak temperature as a maximum in the dw/dT curve and the area between the largest positive inflections on either side of the identified peak in the derivative curve.

Shore hardness was determined according to ISO 868.

Stress-strain properties for in-reactor polymer blends were determined according to ASTM D1708. The specimens were prepared using compression molded plaques. Tensile properties were measured on an Instron™ model 4502 equipped with a 22.48 pounds (10.2 kg) load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain at break were calculated. A minimum of five specimens from each plaque were tested, the results being reported as the average value. All stresses quoted were calculated based upon the original cross-sectional area of the specimen, taking no account of reduced cross-section as a function of increasing strain. Tensile strength is defined as the maximum tensile stress. Tensile strength is also called as ultimate strength. Toughness is defined as the ability of polymer to absorb applied energy before breaking. The area under the stress-strain curve is used as a measure of the toughness.

Melt flow rate (MFR) was determined according to ASTM D1238 using a load of 2.16 kg and at a temperature of 230° C.

Dynamic Mechanical Thermal Analysis (DMTA) examines the behavior of viscoelastic materials according to temperature and frequency dependent behavior. The application of a small stress produces a deformation (strain) in the material. The amount of deformation resulting from the applied stress yields information concerning the moduli of the material; its stiffness and damping properties. The DMTA is a controlled stress instrument applied in a sinusoidal fashion and gives a sinusoidal response versus time. As a consequence of the applied sinusoidal stress the material responds in an elastic (stores energy) and viscous (dissipates energy) manners. DMTA separates these responses into two different moduli values: Elastic Modulus (E) and the loss modulus (E') and in a temperature sweep these moduli are measured from the glassy region, the plateau region to the terminal region. The response of viscoelastic materials is out of phase with the input signal by an angle delta (δ). The tangent of this angle (tan δ) is equal to the ratio E"/E' and it is a valuable indicator of the relative damping ability of the material. Any peak in the tan δ corresponds to a region where the material properties are changing very rapidly; the material is undergoing a transition or relaxation such as Tg (glass transition temperature) and other relaxations. For purpose of this invention and the claims thereto, Tg is determined by DSC, unless DSC cannot determine a Tg, then DMTA shall be used.

Dynamic shear melt rheological data was measured with an Advanced Rheometrics Expansion System (ARES) using parallel plates (diameter=25 mm) at several temperatures ranging from 150 to 210° C. using a pristine compression molded sample at each temperature. The measurements were made over the angular frequency ranged from 0.01-100 rad/s. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material if the strain amplitude is sufficiently small and the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials 0°<δ<90°.

The elongational viscosity (also referred to as extensional viscosity) was measured using the SER-HV-A01 geometry (Xpansion Instruments, LLC) hosted on a strain-controlled rheometer (ARES, Rheometric Scientific).

Examples 1 to 3

These examples demonstrate the use of series reactors operated in the continuous stirred-tank solution process to produce polypropylene in the first reactor and propylene/hexene copolymer in the second reactor for example 1, to produce polypropylene in the first reactor and propylene/ethylene copolymer in the second reactor for example 2 and 4, and to produce propylene/ethylene/1,9 decadiene copolymer in the first reactor and propylene/ethylene copolymer in the second reactor for example 3. The first reactor was 0.5-liter and the second reactor was 1-liter; both of them were stainless steel autoclave reactors and were equipped with a stirrer, a water-cooling/steam-heating element with a temperature controller, and a pressure controller. Solvents, monomers such as ethylene and propylene were first purified by passing through a three-column purification system. Purification columns were regenerated periodically whenever there was evidence of lower activity of polymerization.

The solvent feed to the reactors was measured by a mass-flow meter. A Pulsa feed pump controlled the solvent flow rate and increased the solvent pressure to the reactors. The compressed, liquefied propylene feed was measured by a mass flow meter and the flow was controlled by a Pulsa feed pump. 1,9 decadiene was diluted with toluene. The feed rates of diluted 1,9 decadiene and hexene were controlled using a Eldex metering pump. The solvent, monomers were fed into a manifold first. Ethylene from in-house supply was delivered as a gas solubilized in the chilled solvent/monomer mixture in the manifold. The mixture of solvent and monomers were then chilled to about −15° C. by passing through a chiller prior to feeding into the reactor through a single tube. Ethylene flow rate was metered through a Brookfield mass flow controller. The collected samples were first air-dried in a hood to evaporate most of the solvent, and then dried in a vacuum oven at a temperature of about 90° C. for about 12 hours. The vacuum oven dried samples were weighed to obtain yields. Conversion was calculated basing the polymer yield and the amount of monomers fed in to the reactor. All the reactions were carried out at a pressure of about 2.4 MPa-g.

In Examples 1, 2, and 4, rac-dimethylsilyl bis(2-methyl-4-phenylindenyl) zirconium dimethyl catalyst (Catalyst A) was preactivated with N,N-dimethyl anilinium tetrakis(heptafluoro-2-naphthyl)borate (Activator 1) at a molar ratio of about 1:1 in 900 ml of toluene. In Example 3, the catalyst was rac-dimethylsilylbis(2-methyl-4-carbazol-indenyl)zirconium dimethyl (Catalyst B) preactivated by N,N-dimethylanilinium tetrakis(pentafluorophenyl)borate (Activator 2) at a molar ratio of about 1:1 in 900 ml of toluene. All catalyst solutions were kept in an inert atmosphere with <1.5 ppm water content and fed into reactors by metering pumps. Tri-n-octylaluminum (TNOA) solution was used as a scavenger. Scavenger feed rate was adjusted and optimized to achieve good yield at beginning of each run.

Propylene, isohexane, catalyst solution and scavenger solution were all fed into the first reactor. The content of the first reactor flows into the second reactor. Optionally additional propylene and ethylene were fed into the second reactor. The detailed reaction conditions and polymer properties are listed in Table 1. The molecular weight reported in Table 1 was from light scattering detector.

Example 1 demonstrates the use of series reactors operated in a continuous stirred-tank solution process employing Catalyst A and Activator 1 to produce polypropylene in the first reactor and propylene/hexene copolymer in the second reactor with additional Catalyst A fed into the second reactor. Some of the macromonomers produced in the first reactor were incorporated into the polymer made in the second reactor. Example 2 and 4 employed the same process as that used in Example 1 except that propylene/ethylene copolymer was made in the second reactor. The pre-activated catalyst solution used in Example 2 was aged for about 8 hours in a drybox prior to polymerization run. Example 3 demonstrated a process to produce a propylene/ethylene/1,9-decadiene macromonomer (terpolymer) in the first reactor and using the same catalyst to produce a propylene/ethylene copolymer in the second reactor. Some of the propylene/ethylene/1,9-decadiene macromonomer was incorporated onto the propylene/ethylene copolymer chain to produce a branched block composition. In Example 3, higher crystalline polymer was produced in the second reactor.

TABLE 1

| | Example # | | | |
|---|---|---|---|---|
| | EX 1 | EX 2 | EX 3 | EX 4 |
| Polymerization temperature in 1st reactor (° C.) | 90 | 90 | 80 | 90 |
| Propylene feed rate to 1st reactor (g/min) | 14 | 14 | 14 | 14 |
| Ethylene feed rate to 1st reactor (SLPM) | 0 | 0 | 2 | 0 |
| 1,9 decadiene feed rate to 1st reactor (ml/min) | 0 | 0 | 0.1429 | 0 |
| Isohexane feed rate to 1st reactor (ml/min) | 120 | 80 | 80 | 80 |
| Catalyst/activator | Catalyst A/activator 1 | Catalyst A/activator 1 | Catalyst B/activator 2 | Catalyst A/activator 1 |
| Catalyst feed rate to 1st reactor (mole/min) | 3.78E−08 | 8.33E−08 | 1.20E−07 | 8.33E−08 |
| Polymerization temperature in 2nd reactor (° C.) | 80 | 80 | 100 | 80 |
| Propylene feed rate to 2nd reactor (g/min) | 0 | 0 | 10.2 | 0 |
| Ethylene feed rate to 2nd reactor (SLPM) | 0 | 2 | 0 | 2 |
| 1-hexene feed rate to 2nd reactor (ml/min) | 6 | 0 | 0 | 0 |
| Catalyst/activator | Catalyst A/activator 1 | Catalyst A/activator 1 | none | Catalyst A/activator 1 |
| Catalyst feed rate to 2nd reactor (mole/min) | 7.56E−08 | 3.40E−08 | 0 | 3.40E−08 |
| Yield (g/min) | 8.6 | 9.9 | 23.1 | 9.9 |
| Conversion (%) | 47.8 | 60.6 | 87.4 | 60.6 |
| Tc (° C.) | 108.3 | 102.7 | 85.6 | 63.6 |
| Tm (° C.) | 156.0 | 155.8 | 121.6 | 134.9 |
| Tg (° C.) | | −38.0 | −22.3 | −39.8 |
| Heat of fusion (J/g) | 97.2 | 45.3 | 59.3 | 21.8 |
| Hexene content (wt %) | 2.9 | 0 | 0 | 0 |
| Ethylene content (wt %) | 0 | 10.7 | 7.1 | |
| Complex viscosity at a angular frequency of 0.01 rad/s (Pas) | 825.0 | 240.0 | 1410.0 | 1400.0 |
| MFR (dg/min) | 72.9 | 105.5 | 67.1 | 16.2 |
| Mn (kg/mol) | 106.8 | 39.9 | 94.1 | |
| Mw (kg/mol) | 200.0 | 121.8 | 562.8 | |
| Mz (kg/mol) | 321.7 | 241.1 | 4456.2 | |
| Stress at yield (MPa) | 28.9 | 10.3 | 16.2 | |
| Tensile strength (MPa) | 28.9 | 10.3 | 21.7 | |

TABLE 1-continued

| | Example # | | | |
|---|---|---|---|---|
| | EX 1 | EX 2 | EX 3 | EX 4 |
| Stress at break (MPa) | 18.0 | 4.6 | 21.5 | |
| Strain at break (%) | 413.4 | 287.7 | 721.7 | |

Polymer blend in Example 3 has relatively low melting point for the isotactic polypropylene portion, 121.6° C., suggesting that ethylene from the first reaction was not completely consumed and flowed into the second polymerization reactor.

Small amplitude oscillatory shear data were collected at temperatures of 190° C. over a frequency ranging from 0.01 to 100 rad/s for the polymer blends produced in Examples 1, 2, and 3. The shear thinning measured by the complex viscosity is insignificant when the angular frequency varied from 0.01 to 100 rad/s for Examples 1 and 2. The ratio of complex viscosity at a frequency of 100 rad/s to the viscosity at a frequency of 0.01 rad/s was 0.34 and 0.52 for materials produced in Example 1 and 2, respectively. Significant shear thinning was observed for polymer produced in Example 3. For polymer blend produced in Example 3, the plot of the loss angle versus frequency was substantially below 90°, indicating extensive branching. The loss angle was relatively independent of frequency and varied between 73° and 51° as the frequency changed from 0.01 to 100 rad/s. This is gel-like behavior and indicates extensive branching. The critical relaxation exponent for Example 3 was 0.567, which is also typical of highly branched reactor blends. Example 3 exhibited high amounts of shear thinning The ratio of complex viscosity at a frequency of 100 rad/s to that at a frequency of 0.01 rad/s was 0.049. The plot of the log (dynamic viscosity) versus log (frequency) for Example 3 had a secant slope of −0.328, which indicates branched block structures are present.

The polymer blends produced in Examples 1, 2, and 3 were compressed into plaques for the tensile testing according to the procedure described above. The strain-stress properties of the product are listed in Table 1. For Example 3, the stress at break was 21.5 MPa compared with 16.2 MPa for the stress at the yield point. This increased stress after yielding is due to strain hardening as the branched chains are stretched between crystalline domains and branch points. The strain at break was 721%, which is typical of an ethylene-propylene elastomer. The strain hardening was typical of a crosslinked elastomer and indicated the presence of extensive grafting and long chain branches.

Polymer blend produced in Example 1 has a fraction eluted between 60 to 80° C. with a peak temperature of 71° C. and a solution fraction when fractionated using CRYSTAF according to the procedure described above. The fraction corresponding to the highest temperature peak is referred to as the high crystalline fraction.

The elongational viscosity was measured using the SER-HV-A01 geometry (Xpansion Instruments, LLC) hosted on a strain-controlled rheometer (ARES, Rheometric Scientific). The elongational viscosity of the polymer blends was measured at four constant Hencky strain rates in uniaxial elongational flow at a constant temperature of 180° C. As a comparative example, a commercially available impact copolymer PP7032E2, available from ExxonMobil Chemical Company, Houston Tex., (identified as PP1 in FIG. 1) was also tested for the elongational viscosity. PP7032E2 has an MFR of 4 dg/min (2.16 kg, 230° C.) and a tensile strength at yield (50 mm/min, ASTM D 638) of 24 MPa. As shown in FIG. 1, strong strain hardening was observed for polymer blends produced in Examples 1 and 2. For polymer blend of Example 1, the ratios of elongational viscosity at break to linear viscosity at a strain rate of 1 and 10 sec$^{-1}$ were 11.48 and 8.97, respectively. For polymer blend of Example 2, the ratios of elongational viscosity at break to linear viscosity at a strain rate of 1 and 10 sec$^{-1}$ were 50.84 and 51.55, respectively.

The data plots in FIG. 1 demonstrate melt viscosity differences between the inventive polymer blends and comparative example PP1. The comparative polymer PP1 did not show strain hardening and behaved as a linear viscoelastic material. The different behavior displayed by the inventive in-reactor polymer blend is quite clearly a result of their different composition and molecular architectures.

Polymer blends produced in Examples 1, 2, and 4 and PP1 were subjected to foaming test. The blends for injection foaming experiments were first prepared using a small-size co-rotating twin-screw extruder (Leistritz ZSE18HP-40D). The barrel temperature profiles were 120-180° C., and the screw speed was set at 100 rpm. The extrudate was pelletized and dried under vacuum at 40° C. for 12 hours to remove any residual water. Then, they were compression molded at 180° C. for 2 minutes with pressure load of 3 tons under nitrogen to prepare samples for the rheological tests, which include disks of 25 mm diameter and thickness of approximately 1.5 mm, and sheets of thickness of 0.65-1 mm.

Irganox B225 (from Ciba Specialty Chemicals Corp.) was added to the blends (1.0 wt %) to avoid any thermal degradation. Azodicarbonamide (AC) from Aldrich Chemical was used as the chemical foaming agent.

Injection foaming tests were conducted in an all-electric injection molding machine (Sumitomo SE50S, screw diameter=32 mm). An injection speed of 120 mm/s was used. A rectangular mold with only one sprue set at one end was used to allow the investigation of the cell structures at different distances traveled along the injection direction. Two positions were selected, 35 mm and 90 mm away from the injection port. As 35 mm is close to the sprue, the sample usually will experience a relatively high melt pressure and cell nucleation could be affected. On the other hand, 90 mm is far away from the injection port, and the sample has more free space for foaming; therefore, cell structure should be different from the front one. 1 wt % of AC was used for foaming, which was directly dry blended with the polymer materials before putting into the hopper.

Figure 2:
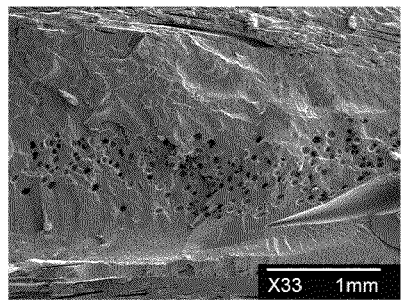
FIG. 2 shows cell structures of injection foamed parts at two different positions away from the injection port (35 and 90 mm) for Examples 1, 2, and 4, as well as comparative example PP1.
Figure 2:
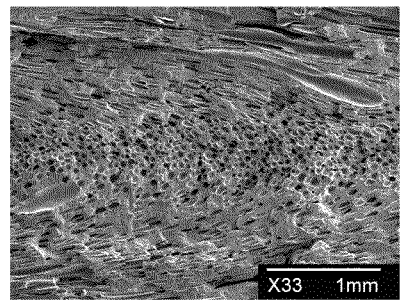
Figure 2:
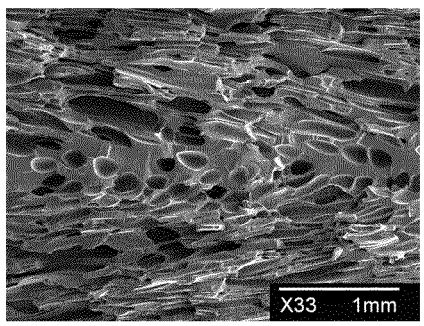
Figure 2:
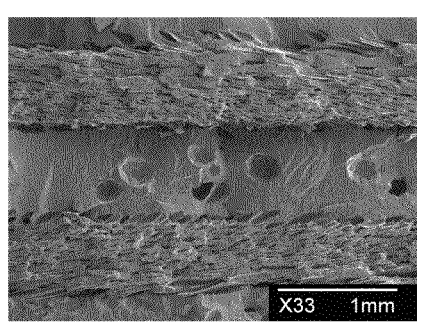
Figure 2:
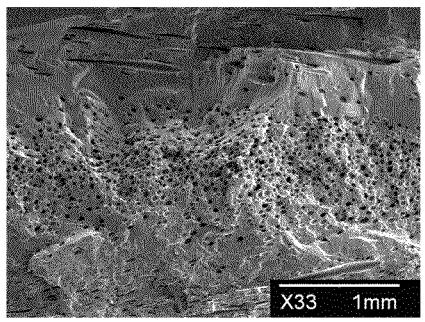
Figure 2:
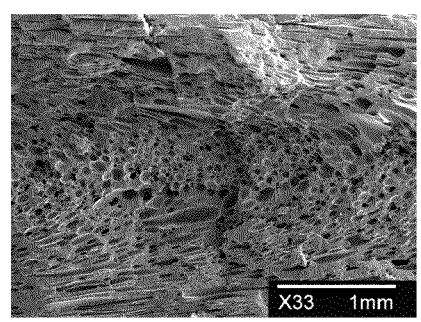
Figure 2:
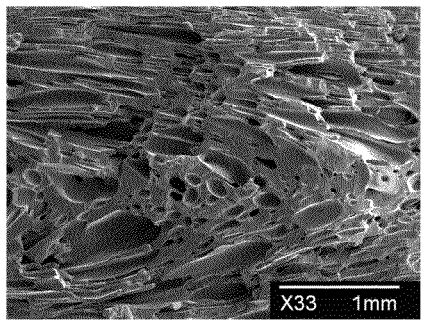
Figure 2:
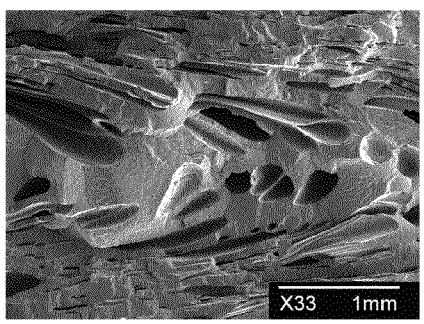

FIG. 2 shows the cell structures of injection foams for the polymer blends made in Example 1, 2, and 4. The images were obtained using SEM and the inspected surface was freeze-fractured in liquid nitrogen. Uniform cell dimension and good cell structures are both observed for Example 1 and 2. Further inspection of micrograph of the foamed article from Example 2 shows that the cells are almost spherical at both 35 mm and 90 mm from the injection port. As a comparative example, PP7032E2 (referred as to PP1 in FIG. 2), a super high impact copolymer from ExxonMobil was also tested for foaming. PP7032E2 has a MFR of 4 dg/min, a tensile strength at yield (50 mm/min, ASTM D 638) of 24 MPa. PP1 shows poor cell structures in both the cell uniformity and cell density.

FIG. 2 shows cell structures of the injection foamed parts at two different positions away from the injection port. Injection conditions: melt temperature=210° C., mold temperature=25° C., cooling time=30 seconds, back pressure=2 MPa, injection speed=120 mm/s, shot size=31 mm (≈83% of the full mold). (a) Example 1 at 35 mm from injection port; (b) Example 2 at 35 mm from injection port; (c) Example 4 at 35 mm from injection port; (d) PP1 at 35 mm from the injection port (comparative); (e) Example 1 at 90 mm from injection port; (f) Example 2 at 90 mm from injection; (g) Example 4 at 90 mm from the injection port; and (h) PP1 at 90 mm from the injection port (comparative).

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

What is claimed is:

1. A foamable thermoplastic in-reactor polymer blend comprising:
   (a) a first propylene polymer component comprising 90 to 100 wt % propylene and from 0 to less than 10 wt % comonomer, said first propylene component having a Tm of 120° C. or more;
   (b) a second propylene polymer component comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer; and
   (c) from 0 to about 10 wt % based on the total material in the blend of foaming agent; wherein, prior to combination with the foaming agent, the polymer blend has:
      (i) a Tm of at least 120° C.;
      (ii) a melt flow rate of 10 dg/min or more;
      (iii) a tensile strength of at least 8 MPa;
      (iv) an elongation at break of at least 200%;
      (v) a ratio of elongational viscosity at break to linear viscosity of 5 or more when the elongational viscosity is measured at a strain rate of 1 sec$^{-1}$ and 180° C., and where when the blend is foamed, the foamed article has a density of 800 kg/m$^3$ or less.

2. The foamable thermoplastic in-reactor polymer blend of claim 1, wherein the foaming agent includes one or more of azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; carbon dioxide; nitrogen; argon; water; air; nitrogen; helium; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis (benzene sulfonyl hydrazide); diphenyl sulfone-3,3'-disulfonyl hydrazide; calcium azide; 4,4'-diphenyl disulfonyl azide; and p-toluene sulfonyl azide.

3. The foamable thermoplastic in-reactor polymer blend of claim 1, wherein the foaming agent is present in the composition at from about 0.01 to about 10 wt % based on the total material in the blend.

4. The foamable thermoplastic in-reactor polymer blend of claim 1, wherein a foaming assistant is used with the foaming agent.

5. The foamable thermoplastic in-reactor polymer blend of claim 1, wherein a foaming assistant is used with the foaming agent and the foaming agent is selected from the group consisting of salicylic acid, phthalic acid, stearic acid, nitric acid, urea and derivatives thereof.

6. The foamable thermoplastic in-reactor polymer blend of claim 1, wherein when the blend is foamed the foam has 50% or more closed cell structure.

7. The foamable thermoplastic in-reactor polymer blend of claim 1, wherein when the blend is foamed the foam has a density of 600 kg/m$^3$ or less.

8. The foamable thermoplastic in-reactor polymer blend of claim 1, wherein when the blend is foamed the foam has an averaged cell size of 1 mm or less.

9. The foamable thermoplastic in-reactor polymer blend of claim 1, wherein the polymer blend has a Tm of 135° C. or more.

10. The foamable thermoplastic in-reactor polymer blend of claim 1, wherein the polymer blend has a heat of fusion of 30 J/g-80 J/g.

11. The foamable thermoplastic in-reactor polymer blend of claim 1, wherein the polymer blend further comprises one or more particulate solids.

12. The foamable thermoplastic in-reactor polymer blend of claim 1, wherein the polymer blend has a complex viscosity of 4000 Pa·s or less, where the complex viscosity is measured at 190° C. over an angular frequency range of 0.01 to 100 rad/s.

13. The foamable thermoplastic in-reactor polymer blend of claim 1, wherein the polymer blend has a ratio of elongational viscosity at break to the linear viscosity of 3 or more when the elongational viscosity is measured at a strain rate of 5 sec$^{-1}$ and a temperature of 180° C.

14. The foamable thermoplastic in-reactor polymer blend of claim 1, wherein the polymer blend has a melt flow rate of 20 dg/min or more.

15. A process for producing a foamed polyolefin article, comprising:
- (a) mixing a foaming agent with a molten polyolefin to form a foamable mixture;
- (b) forming said foamable mixture so that said foaming agent expands within said mixture to produce a foam; and
- (c) obtaining a foamed article having has a density of 800 kg/m³ or less, wherein the molten polyolefin is a foamable thermoplastic in-reactor polymer blend comprising:
  - (a) a first propylene polymer component comprising 90 to 100 wt % propylene and from 0 to less than 10 wt % comonomer, said first propylene polymer component having a Tm of 120° C. or more; and
  - (b) a second propylene polymer component comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer;
  - wherein the polymer blend has:
    - (i) a Tm of at least 120° C.;
    - (ii) a melt flow rate of 10 dg/min or more;
    - (iii) a tensile strength of at least 8 MPa;
    - (iv) an elongation at break of at least 200%; and
    - (v) a ratio of elongational viscosity at break to linear viscosity of 5 or more when the elongational viscosity is measured at a strain rate of 1 sec$^{-1}$ and 180° C.

16. The process of claim 15, wherein the foaming agent includes one or more of azodicarbonamide; azodiisobutyronitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoroethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; carbon dioxide; nitrogen; argon; water; air; nitrogen; helium; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; and p-toluene sulfonyl azide.

17. The process of claim 15, wherein the foaming agent is present in the composition at from about 0.01 to about 10 wt % based on the total material in the blend.

18. The process of claim 15, wherein a foaming assistant is used with the foaming agent.

19. The process of claim 15, wherein a foaming assistant is used with the foaming agent and the foaming agent is selected from the group consisting of salicylic acid, phthalic acid, stearic acid, nitric acid, urea and derivatives thereof.

20. The process of claim 15, wherein when the foamed article has 50% or more closed cell structure.

21. The process of claim 15, wherein foamed article has a density of 600 kg/m³ or less.

22. The process of claim 15, wherein when the foamed article has an averaged cell size of 1 mm or less.

23. The process of claim 15, wherein the polymer blend has a Tm of 135° C. or more, a heat of fusion of 30 J/g to 80 J/g, a complex viscosity of 4000 Pa·s or less, where the complex viscosity is measured at 190° C. over an angular frequency range of 0.01 to 100 rad/s.

24. The process of claim 15, wherein the polymer blend has a ratio of elongational viscosity at break to the linear viscosity of 3 or more when the elongational viscosity is measured at a strain rate of 5 sec$^{-1}$ and a temperature of 180° C.

25. The process of claim 15, wherein the polymer blend further comprises one or more particulate solids.

26. A foam article comprising an in-reactor polymer blend comprising:
- (a) a first propylene polymer comprising 90 to 100 wt % propylene and from 0 to less than 10 wt % comonomer, said first propylene component having a Tm of 120° C. or more; and
- (b) a second propylene polymer comprising from 30 to 90 wt % propylene and 70 to 10 wt % comonomer, said second propylene polymer having an Mw of 30,000 g/mol or more, and said second propylene-containing polymer having a crystallinity different by at least 5% from the first polymer; wherein the polymer blend has:
  - (i) a Tm of at least 120° C.;
  - (ii) a melt flow rate of 10 dg/min or more;
  - (iii) a tensile strength of at least 8 MPa;
  - (iv) an elongation at break of at least 200%;
  - (v) a ratio of elongational viscosity at break to linear viscosity of 5 or more when the elongational viscosity is measured at a strain rate of 1 sec$^{-1}$ and 180° C.; and
where the foam article has a density of 800 kg/m³ or less.

27. The article of claim 26, wherein the foam article has an averaged cell size of 1 mm or less.

28. The article of claim 26, wherein the foam article has 50% or more closed cells.

* * * * *